United States Patent
Quirynen et al.

(10) Patent No.: US 11,327,449 B2
(45) Date of Patent: May 10, 2022

(54) NONLINEAR OPTIMIZATION FOR STOCHASTIC PREDICTIVE VEHICLE CONTROL

(71) Applicant: Mitsubishi Electric Research Laboratories, Inc., Cambridge, MA (US)

(72) Inventors: Rien Quirynen, Cambridge, MA (US); Xuhui Feng, Shanghai (CN); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 42 days.

(21) Appl. No.: 16/886,825

(22) Filed: May 29, 2020

(65) Prior Publication Data

US 2021/0373513 A1 Dec. 2, 2021

(51) Int. Cl.
*G05B 13/04* (2006.01)
*G05B 13/02* (2006.01)
*G06F 17/13* (2006.01)

(52) U.S. Cl.
CPC ....... *G05B 13/048* (2013.01); *G05B 13/0275* (2013.01); *G06F 17/13* (2013.01)

(58) Field of Classification Search
None
See application file for complete search history.

(56) References Cited

U.S. PATENT DOCUMENTS

| | | | |
|---|---|---|---|
| 10,409,233 B2 * | 9/2019 | Quirynen | G06F 17/11 |
| 2004/0024527 A1 * | 2/2004 | Patera | G08G 5/045 |
| | | | 701/301 |
| 2010/0057361 A1 * | 3/2010 | Caveney | B60W 50/0097 |
| | | | 701/301 |
| 2016/0202670 A1 * | 7/2016 | Ansari | G05B 13/048 |
| | | | 700/45 |
| 2019/0188592 A1 * | 6/2019 | Berntorp | G06N 7/005 |

OTHER PUBLICATIONS

Kim et al. 'Nonlinear Model Predictive Coordinated Standoff Tracking of a Moving Ground Vehicle' Journal of Guidance, Control, and Dynamics vol. 36, No. 2, Mar.-Apr. 2013.*
Liu et al. 'Nonlinear Stochastic Predictive Control with Unscented Transformation for Semi-Autonomous Vehicles' 2014 American Control Conference (ACC) Jun. 4-6, 2014.*

* cited by examiner

*Primary Examiner* — Bernard G Lindsay
(74) *Attorney, Agent, or Firm* — Gennadiy Vinokur; Hironori Tsukamoto

(57) ABSTRACT

A predictive controller controls a system under uncertainty subject to constraints on state and control variables of the system. At each control step, the predictive controller solves an inequality constrained nonlinear dynamic optimization problem including probabilistic chance constraints representing the uncertainty to produce a control command, and controls an operation of the system using the control command. The predictive controller solves the dynamic optimization problem based on a two-level optimization that alternates, until a termination condition is met, propagation of covariance matrices of the probabilistic chance constraints within the prediction horizon for fixed values of the state and control variables with optimization of the state and control variables within the prediction horizon for fixed values of the covariance matrices.

17 Claims, 26 Drawing Sheets

Solve the optimal control structured nonlinear program (NLP) — 350

$$\min_{x,u,P} \sum_{k=0}^{N-1} l(x_k, u_k + K x_k) + m(x_N) \quad \text{—351}$$

s.t.
$$\begin{cases} \forall k \in \{0, \ldots, N-1\}, \\ 0 = x_{k+1} - f(x_k, u_k + K x_k, 0), \quad x_0 = \hat{x}_t, \quad \text{—352} \\ 0 = P_{k+1} - \left(\hat{A}_k P_k \hat{A}_k^T + \hat{B}_k \Sigma \hat{B}_k^T\right), \quad P_0 = \hat{P}_t, \quad \text{—353} \\ u_{\min} \le u_k + K x_k \le u_{\max}, \quad \text{—354} \\ 0 \ge h_i(x_k, u_k + K x_k) + \alpha_i \sqrt{C_{k,i} P_k C_{k,i}^T}, \forall i, \quad \text{—355} \end{cases}$$

—121, —356

$$\equiv \sim 625$$

Compact formulation of the optimal control structured NLP for the stochastic predictive controller — 630

$$\min_{y,z} \frac{1}{2} \| L(y) \|_2^2 \quad \text{—631}$$

s.t.
$$\begin{cases} 0 = F(y), \quad \text{—632} \\ 0 = E(y, z), \\ 0 \ge I(y, z) \quad \text{—634} \end{cases} \quad \text{—633}$$

$$y = [x_0^T, u_0^T, \ldots, x_{N-1}^T, u_{N-1}^T, x_N^T]^T, \quad \text{—636}$$
$$z = [\text{vec}(P_0)^T, \ldots, \text{vec}(P_{N-1})^T, \text{vec}(P_N)^T]^T \quad \text{—637}$$

$$F(y) := \begin{bmatrix} x_0 - \hat{x}_t \\ \vdots \\ x_N - f(x_{N-1}, u_{N-1} + K x_{N-1}, 0) \end{bmatrix} \quad \text{—632}$$

$$E(y,z) := \begin{bmatrix} P_0 - \hat{P}_t \\ \vdots \\ P_N - \left(\hat{A}_{N-1} P_{N-1} \hat{A}_{N-1}^T + \hat{B}_{N-1} \Sigma \hat{B}_{N-1}^T\right) \end{bmatrix}$$

Fig. 6B

Algorithm 1 Real-time Adjoint-based Stochastic NMPC ~ 840

1: Input: Guess $(y^i, z^i, \lambda^i, \mu^i, \kappa^i)$, and feedback gain $K$. ~ 841
   Preparation step of QP subproblem: ~ 845
2: for $k = 0, \ldots, N$ do
3:     Compute Jacobians $\frac{\partial E}{\partial y_k}(y_k^i)$ and $\frac{\partial L}{\partial y_k}(y_k^i, z_k^i)$ using forward AD. ~ 846
4:     Evaluate gradient $g_{a,k}^i = g_k^i + \frac{\partial E}{\partial y_k}(y_k^i, z_k^i)^\top \mu_k^i$ using adjoint AD. ~ 847
5: end for
6: Evaluate $\tilde{I}(y^i, z^i) = I(y^i, z^i) - \frac{\partial L}{\partial z}(\cdot) \frac{\partial E}{\partial z}(\cdot)^{-1} E(y^i, z^i)$ using forward AD. ~ 848
   Solution step of block-sparse QP: ~ 850
7: Receive current state estimate $\hat{x}_t$. ~ 851
8: Solve local QP approximation to obtain $\Delta y^i$, $\sigma_F^i$ and $\sigma_I^i$. ~ 852
9: $y^{i+1} \leftarrow y^i + \Delta y^i$, $\lambda^{i+1} \leftarrow \sigma_F^i$, and $\kappa^{i+1} \leftarrow \sigma_I^i$. ~ 853
10: Feedback: send control $u^* = u_0^{i+1} + K\hat{x}_t$ to process. ~ 855
    Expansion step for variables: ~ 860
11: Compute $\mu^{i+1} \leftarrow \sigma_E^i = -\frac{\partial E}{\partial z}(y^i, z^i) - \top \frac{\partial L}{\partial z}(y^i, z^i)^\top \sigma_I^i$ using adjoint AD. ~ 861
12: Compute $z^{i+1} \leftarrow z^i + \Delta z^i$ or $z^{i+1} \leftarrow E_z(y^{i+1})$. ~ 862
13: Output: New values $(y^{i+1}, z^{i+1}, \lambda^{i+1}, \mu^{i+1}, \kappa^{i+1})$. ~ 856

Given the block-structured sparsity of the constraint Jacobian matrices in — 911

$$\frac{\partial I^\top}{\partial z} = \begin{bmatrix} \frac{\partial I_0}{\partial z_0}^\top & & \\ & \ddots & \\ & & \frac{\partial I_N}{\partial z_N}^\top \end{bmatrix}, \quad \frac{\partial E^\top}{\partial z} = \begin{bmatrix} \mathbb{I} & -\tilde{A}_0^\top \otimes \bar{A}_0^\top & & \\ & \mathbb{I} & \ddots & \\ & & \ddots & -\tilde{A}_{N-1}^\top \otimes \bar{A}_{N-1}^\top \\ & & & \mathbb{I} \end{bmatrix}$$

$$\sigma_{\mathcal{L}}^i = -\frac{\partial E}{\partial z}^{-\top} \frac{\partial I^\top}{\partial z} \sigma_I^i$$

912

→ 913

915

The Lagrange multiplier values for the covariance propagation constraints can be evaluated sequentially using the following backward recursion $$\tilde{\sigma}_{I_N}^i = \frac{\partial I_N}{\partial z_N}^\top \sigma_{I_N}^i, \quad \sigma_{E_N}^i = -\tilde{\sigma}_{I_N}^i$$

$$\tilde{\sigma}_{I_k}^i = \frac{\partial I_k}{\partial z_k}^\top \sigma_{I_k}^i, \quad \sigma_{E_k}^i = -\tilde{\sigma}_{I_k}^i - (\tilde{A}_k \otimes \bar{A}_k) \tilde{\sigma}_{I_{k+1}}^i, \quad k = N-1, \ldots, 0,$$

Fig. 9B

NONLINEAR OPTIMIZATION FOR STOCHASTIC PREDICTIVE VEHICLE CONTROL

TECHNICAL FIELD

The invention relates generally to predictive control, and more particularly to an inexact derivative-based optimization method and apparatus for stochastic predictive control of nonlinear dynamical systems in the presence of uncertainty.

BACKGROUND

Nonlinear model predictive control (NMPC) has grown mature and shown its capability of handling relatively complex constrained processes. A predictive controller, such as NMPC, is used in many applications to control complex dynamical systems that are described by a set of nonlinear differential equations, i.e., a system of ordinary differential equations (ODE), differential-algebraic equations (DAE) or partial differential equations (PDE). Examples of such systems include production lines, vehicles, satellites, engines, robots, power generators and other numerically controlled machines.

Although NMPC exhibits an inherent robustness due to feedback, such controllers do not take uncertainties directly into account and, consequently, the satisfaction of safety-critical constraints cannot be guaranteed in the presence of model uncertainties or external disturbances. One alternative approach is robust NMPC that relies on the optimization of control policies under worst-case scenarios in the presence of bounded uncertainty. However, robust NMPC can lead to a conservative control performance, due to the worst-case scenarios occurring with an extremely small probability.

Stochastic NMPC aims at reducing the conservativeness of robust NMPC by directly incorporating the probabilistic description of uncertainties into the optimal control problem (OCP) formulation. It requires constraints to be satisfied with a certain probability, i.e., by formulating so-called chance constraints that allow for a specified, yet non-zero, probability of constraint violation. In addition, stochastic NMPC is advantageous in settings where high performance in closed-loop operation is achieved near the boundaries of the plant's feasible region. In the general case, chance constraints are computationally intractable and typically require an approximate formulation.

Sampling techniques characterize the stochastic system dynamics using a finite set of random realizations of uncertainties, which may lead to a considerable computational cost, due to a large number of samples that is often required for uncertainty propagation. Scenario-based methods exploit an adequate representation of the probability distributions, but the task of determining the number of scenarios leads to a tradeoff between robustness and computational efficiency. Gaussian-mixture approximations can be used to describe the transition probability distributions of states, but the adaptation of the weights is often computationally expensive. Another approach relies on the use of polynomial chaos (PC), which replaces the implicit mappings with expansions of orthogonal polynomial basis functions but, for time-varying uncertainties, PC-based stochastic NMPC requires many expansion terms. Therefore, a direct but approximate propagation of uncertainty is needed to formulate probabilistic chance constraints in stochastic predictive control of nonlinear system dynamics.

Direct optimal control methods rely on the discretization of the continuous-time differential equations, based on a discretization of the control horizon and a corresponding parameterization of the control action over the prediction horizon. In addition, for stochastic predictive control applications, a discrete-time or discretized set of equations to propagate the uncertainty for the nonlinear system dynamics, based on a parameterization of the control feedback over the prediction horizon, can be included in the direct OCP formulation. The resulting large-scale nonlinear optimization problem or nonlinear program (NLP) can be solved by any nonlinear optimization solver. However, in the case of real-time applications of predictive control for nonlinear systems, this nonlinear optimization problem needs to be solved under strict timing constraints and on embedded hardware with limited computational power and with limited available memory.

Stochastic predictive control for a system described by nonlinear differential equations, requires the solution of a nonlinear stochastic optimal control problem at each control time step. Instead of solving each problem exactly, one real-time iteration of a sequential quadratic programming (SQP) method can be performed in order to update a solution guess from one time point to the next. Such a Newton-type SQP algorithm requires a linearization of the discretized nonlinear dynamics at each iteration of the algorithm. This linearization can be costly, especially for the set of equations that describe the uncertainty propagation for the nonlinear system dynamics, and it requires a Jacobian evaluation when using an explicit integration method and can additionally require matrix factorizations, matrix-matrix multiplications and/or an iterative procedure to solve a nonlinear system of equations in case of an implicit integration method.

Accordingly, there is a need to reduce the computational cost of SQP solvers in real-time applications of stochastic predictive control for nonlinear dynamical systems with uncertainty.

SUMMARY

It is an object of some embodiments to provide a system and a method for controlling a system under uncertainty by solving an inequality constrained nonlinear dynamic optimization problem including probabilistic chance constraints, based on a discretization of the nonlinear differential equations that describe the dynamic model of the system and a discrete-time propagation of the uncertainty for the nonlinear system dynamics. Each of the probabilistic chance constraints aims to ensure that the probability of violating the corresponding inequality constraint is below a certain probability threshold value.

Some embodiments of the invention use a formulation of the probabilistic chance constraints that is based on a tightening for each of the inequality constraints with a term that depends on a back-off coefficient value, a constraint Jacobian matrix and a covariance matrix for the predicted state value at that particular time step. Some embodiments of the invention are based on the realization that the covariance matrices can be computed efficiently for the state values at each time step in the control horizon, using an approximate linearization-based covariance propagation. The covariance equations can be based on a discretization of the linearization-based propagation of uncertainty for the continuous-time nonlinear system dynamics. Alternatively, discrete-time covariance propagation can be done directly based on linearization of the discretized set of nonlinear dynamic equations.

Some embodiments are based on the realization that the discrete-time covariance propagation equations can reduce the computational cost and preserve positive definiteness of the covariance matrices at each control time step. Some embodiments can include nonlinearity bounders in the linearization-based covariance propagation to ensure that the covariance matrices are an overestimate of the exact covariance for the predicted state value at each time step, such that each of the probabilistic chance constraints ensures that the probability of violations is below a certain threshold value.

Some embodiments of the invention are based on the realization that the feedback control action should be taken into account in the forward propagation of the uncertainty for the predicted state values. Some embodiments use a time-invariant or a time-varying sequence of affine feedback gains to pre-stabilize the nonlinear system dynamics, resulting in covariance propagation equations that directly consider the effects of feedback control actions on the uncertainty in the future. For example, the infinite-horizon linear-quadratic regulator for the linearized system dynamics at reference steady state and input values could be used to pre-stabilize the system dynamics in the stochastic nonlinear OCP formulation.

Using an approximate formulation of the probabilistic chance constraints, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

When the original dynamic model of the system is described by a set of continuous-time differential equations, some embodiments of the invention discretize the system dynamics using an explicit or implicit numerical integration method and the linearization requires a corresponding Jacobian evaluation to construct the discrete-time or discretized covariance propagation equations. Some embodiments are based on the realization that a linearization for the covariance propagation equations, in each iteration of a Newton-type optimization algorithm, requires the evaluation of higher order derivatives for the nonlinear system dynamics, which forms a computationally expensive step in case the dynamics are highly dimensional, in case they involve lengthy nonlinear expressions or if they are described by a set of stiff or implicitly defined differential equations.

In addition, some embodiments of the invention are based on the realization that the computational complexity and the memory requirements for the solution of an exact linearization-based optimization algorithm for stochastic nonlinear predictive control is much larger than a nominal implementation that does not directly take the uncertainty into account. More specifically, for solving the block-structured QP approximation in nominal NMPC, the memory requirements scale asymptotically as $O(N m^2)$, in which N denotes the length of the control horizon and m denotes the number of state and control variables at each time step in the control horizon.

In addition, the computational complexity scales asymptotically as $O(N m^3)$ when solving the block-structured QP in nominal NMPC. Therefore, the memory requirements and the computational complexity of an exact linearization-based optimization algorithm for stochastic nonlinear predictive control scale asymptotically as $O(N m^4)$ and $O(N m^6)$, respectively, due to the m×m covariance matrices for the predicted state value at each time step and the corresponding equations. Note that the memory requirements for stochastic NMPC can be reduced to $O(N m^3)$, based on the realization that the covariance propagation dynamics are linear with respect to the covariance and the matrices are defined by the Kronecker product of constraint Jacobian matrices.

Some embodiments of the invention propose instead an inexact derivative-based optimization algorithm for stochastic nonlinear predictive control for which the memory requirements and the computational complexity scale asymptotically as $O(N m^2)$ and $O(N m^3)$, respectively. Some embodiments of the invention are based on an inexact SQP optimization algorithm that allows the numerical elimination of the covariance matrices from each QP subproblem while preserving the block-structured problem sparsity, resulting in a considerable reduction of the memory requirements and computational complexity. The inexact linearization-based optimization algorithm does not compute any derivatives of the covariance propagation equations with respect to state or control variables, and it therefore does not require any higher order derivatives of the system dynamics. In addition, each QP subproblem in the inexact SQP algorithm includes only state and control variables over the control horizon, while the covariance matrices can be computed explicitly in a separate propagation procedure.

In some embodiments of the invention, the proposed inexact optimization algorithm for stochastic nonlinear predictive control consists of three main computational steps. The first step prepares the linear-quadratic objective function, computes the Jacobian matrices to prepare the linearized equality and inequality constraints and it computes a trajectory of covariance matrices, which represent the uncertainty for the predicted state values over the control horizon, by evaluating the nonlinear covariance propagation equations for a given trajectory of predicted state and control values. Therefore, unlike standard optimization algorithms, the proposed algorithm preserves the positive definiteness of the covariance matrices at each time step in each iteration of the inexact SQP algorithm. The second step consists of the solution of the resulting block-structured QP subproblem, with one or multiple tightened inequality constraints to approximate each of the individual chance constraints. The third and final step includes the Newton-type update for the trajectories of predicted state and control values.

Some embodiments of the invention are based on the realization that an inexact linearization-based optimization algorithm converges to a solution of the stochastic nonlinear OCP that is feasible with respect to the system dynamics, covariance propagation equations, inequality constraints and probabilistic chance constraints, but the solution can be suboptimal due to the inexact derivative computations. Instead, some embodiments of the invention are based on an inexact linearization-based optimization algorithm with adjoint gradient computations that converges to a solution of the stochastic nonlinear OCP that is both feasible and optimal. Note that adjoint computations for the covariance propagation equations require the evaluation of higher order derivatives of the system dynamics but corresponding to a single gradient rather than a complete Jacobian matrix. The latter adjoint gradient computations can be carried out efficiently using one sweep of an adjoint mode of algorithmic or automatic differentiation.

In some embodiments of the invention, the proposed inexact optimization algorithm with adjoint gradient computations for stochastic nonlinear predictive control consists of three main computational steps. The first step prepares the linear-quadratic objective function, computes the Jacobian matrices with respect to state and control variables to prepare the linearized equality and inequality constraints, it computes the adjoint based gradient evaluation and numerically eliminates the covariance matrices from each of the objective and constraint functions, given the current trajectory of predicted state and control values and corresponding covariance matrices. The second step consists of the solution of the resulting block-structured QP subproblem, with one or multiple tightened inequality constraints to approximate each of the individual chance constraints. The third and final step includes the Newton-type update for the trajectories of predicted state and control values, as well as an expansion of the corresponding update of Lagrange multipliers and an update for the trajectory of covariance matrices over the control horizon.

Some embodiments of the invention are based on the realization that, in addition to the covariance matrices, also the state variables in the stochastic optimal control problem can be eliminated numerically in each iteration based on a condensing procedure that uses the discrete-time system dynamics to define the state variables at each stage in the prediction horizon as a function of the initial state values and the control variables at all the previous stages in the prediction horizon. This complete or partial condensing procedure results in a smaller but generally denser optimization problem with less or no equality constraints and the same amount of inequality constraints and probabilistic chance constraints, which are described in terms of the remaining optimization variables in the OCP. Some embodiments of the invention are based on the realization that the same inexact linearization-based optimization algorithm can be used in combination with such a condensing procedure. More specifically, the numerical elimination of the state variables would additionally be performed in the first step, the dense QP solution would be performed in the second step, while the expansion of the condensed state variables would additionally be performed in the third step of the inexact optimization algorithm for stochastic nonlinear predictive control.

Some embodiments of the invention use a real-time iteration method for solving the nonlinear stochastic OCP by performing, at each control step in a predictive controller, one iteration of the proposed inexact SQP method. This means that, at each control step, one needs to perform only one preparation, solution and expansion step for a block-structured local QP approximation of the nonlinear stochastic optimization problem. The QP preparation includes the linearization of the nonlinear equations that impose the discretized nonlinear system dynamics, the linearization of nonlinear inequality constraints, the condensing or elimination of the covariance matrices and the optional computation of the adjoint gradient. Based on this preparation, the resulting block-structured QP is solved, followed by an expansion step to update all primal optimization variables and Lagrange multiplier values, in order to produce the control solution that is used to control the system at each step of the predictive controller.

Accordingly, one embodiment discloses a predictive controller for controlling a system under uncertainty subject to constraints on state and control variables of the system, comprising: at least one processor; and memory having instructions stored thereon that, when executed by the at least one processor, cause the predictive controller to: solve, at each control step of the predictive controller, an inequality constrained nonlinear dynamic optimization problem including probabilistic chance constraints representing the uncertainty to produce a control command, wherein the predictive controller solves the dynamic optimization problem based on a two-level optimization that alternates, until a termination condition is met, propagation of covariance matrices of the probabilistic chance constraints within the prediction horizon for fixed values of the state and control variables with optimization of the state and control variables within the prediction horizon for fixed values of the covariance matrices; and control an operation of the system using the control command.

Another embodiment discloses a predictive control method for controlling a system under uncertainty subject to constraints on state and control variables of the system, wherein the method uses a processor coupled with stored instructions implementing the method, wherein the instructions, when executed by the processor carry out steps of the method, including solving, at each control step of the predictive control method, an inequality constrained nonlinear dynamic optimization problem including probabilistic chance constraints representing the uncertainty to produce a control command, wherein the predictive controller solves the dynamic optimization problem based on a two-level optimization that alternates, until a termination condition is met, propagation of covariance matrices of the probabilistic chance constraints within the prediction horizon for fixed values of the state and control variables with optimization of the state and control variables within the prediction horizon for fixed values of the covariance matrices; and controlling an operation of the system using the control command.

Yet another embodiment discloses a non-transitory computer readable storage medium embodied thereon a program executable by a processor for performing a predictive control method for controlling a system under uncertainty subject to constraints on state and control variables of the system, the method includes solving, at each control step of the predictive control method, an inequality constrained nonlinear dynamic optimization problem including probabilistic chance constraints representing the uncertainty to produce a control command, wherein the predictive controller solves the dynamic optimization problem based on a two-level optimization that alternates, until a termination condition is met, propagation of covariance matrices of the probabilistic chance constraints within the prediction horizon for fixed values of the state and control variables with optimization of the state and control variables within the prediction horizon for fixed values of the covariance matrices; and controlling an operation of the system using the control command.

BRIEF DESCRIPTION OF THE DRAWINGS

FIG. 6B shows a compact formulation of the optimal control structured NLP that needs to be solved by the stochastic predictive controller;

FIG. 8C is an algorithmic description of a real-time variant for the adjoint-based inexact SQP optimization algorithm to implement stochastic nonlinear model predictive control, according to some embodiments of the invention.

FIG. 9B is a block diagram of the exploitation of the block-structured sparsity of the constraint Jacobian matrices in a backward recursion to compute the updated Lagrange multiplier values in the adjoint-based SQP optimization algorithm.

DETAILED DESCRIPTION

Some embodiments of the invention provide a system and a method for controlling an operation of a system with uncertainty or a system using a stochastic predictive controller. An example of the stochastic predictive controller is a stochastic model predictive control (SMPC) determining control inputs based on a model of the controlled system and a model of the uncertainty.

Figure 1A:
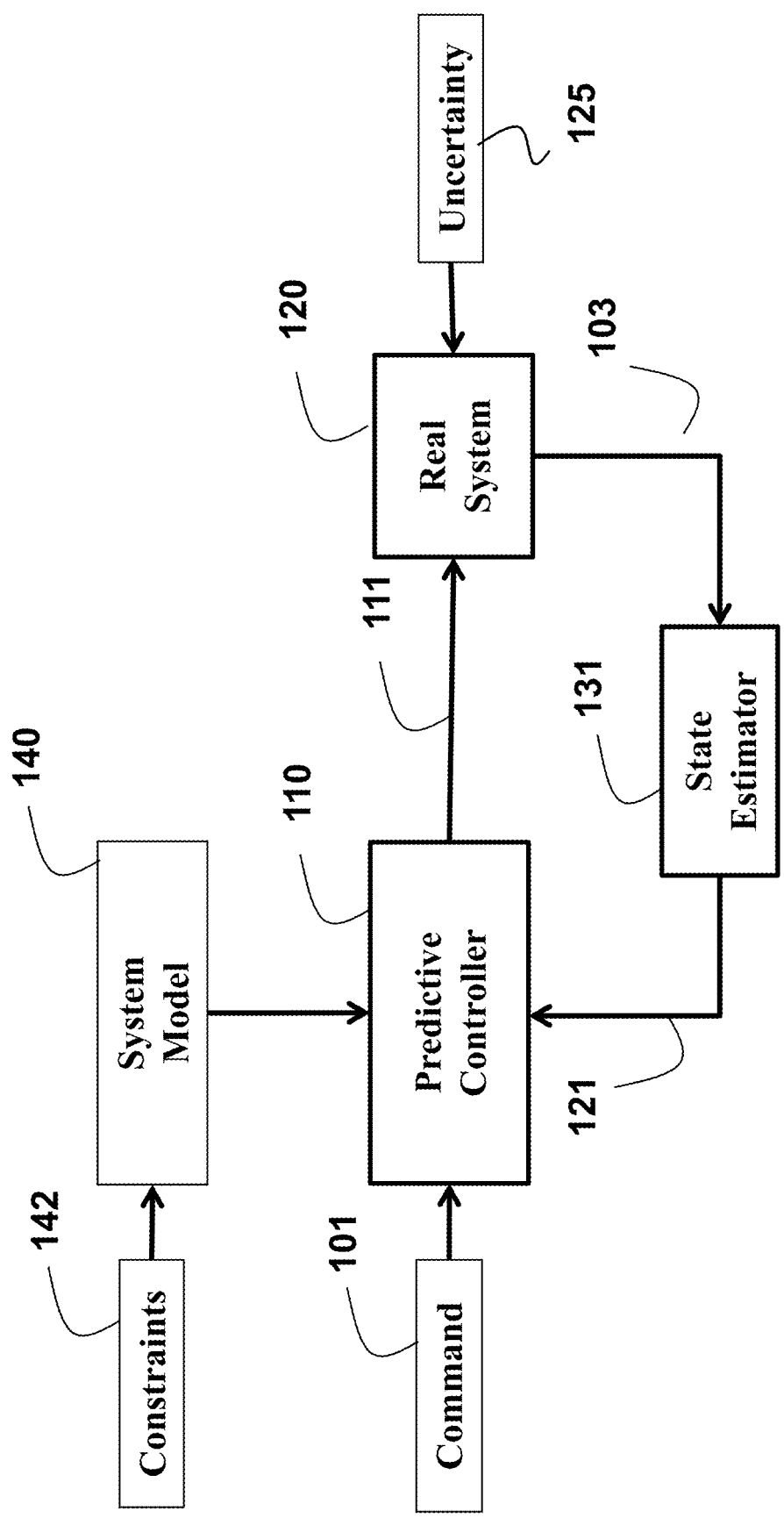
FIG. 1A is a block diagram of a predictive controller and feedback loop for a system with uncertainty according to some embodiments.

FIG. 1A shows an example system 120 with uncertainty 125, connected to a predictive controller 110 via a state estimator 131 according to some embodiments. In some implementations, the predictive controller is a model predictive controller (MPC) programmed according to a dynamical model 140 of the system. The model can be a set of equations representing changes of the state and output 103 of the system 120 over time as functions of current and previous inputs 111 and previous outputs 103. The model can include constraints 142 that represent physical and operational limitations of the system. During the operation, the controller receives a command 101 indicating the desired behavior of the system. The command can be, for example, a motion command. In response to receiving the command 101, the controller generates a control signal 111 that serves as an input for the real system 120 with uncertainty 125. In response to the input, the system updates the output 103 of the system. Based on measurements of the output of the system 103, the estimator updates the estimated state of the system 121. This estimated state of the system 121 provides the state feedback to the controller 110.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The uncertainty 125 can be any time-varying uncertainties, including any external disturbances, forces or torques acting on the system 120, any unmodeled dynamics or any uncertainties in physical quantities such as uncertain friction coefficients, mass of a body or uncertain coefficients and parameters in the dynamic model equations that describe the physical behavior of the real system 120. Most implementations of MPC controllers use a simplified dynamic model 140, resulting in a large amount of the physical behavior in the real system to remain unmodeled, in order to reduce the computational complexity of the controller or because some of the physical behavior is too complex and therefore difficult or impossible to model. Note that time-invariant uncertainties can be estimated or learned, either online or offline, as part of the state and parameter estimator 131.

A dynamic model of the system 140 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system. The real system 120 can be subject to physical limitations and specification constraints 142 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 131 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 1B:
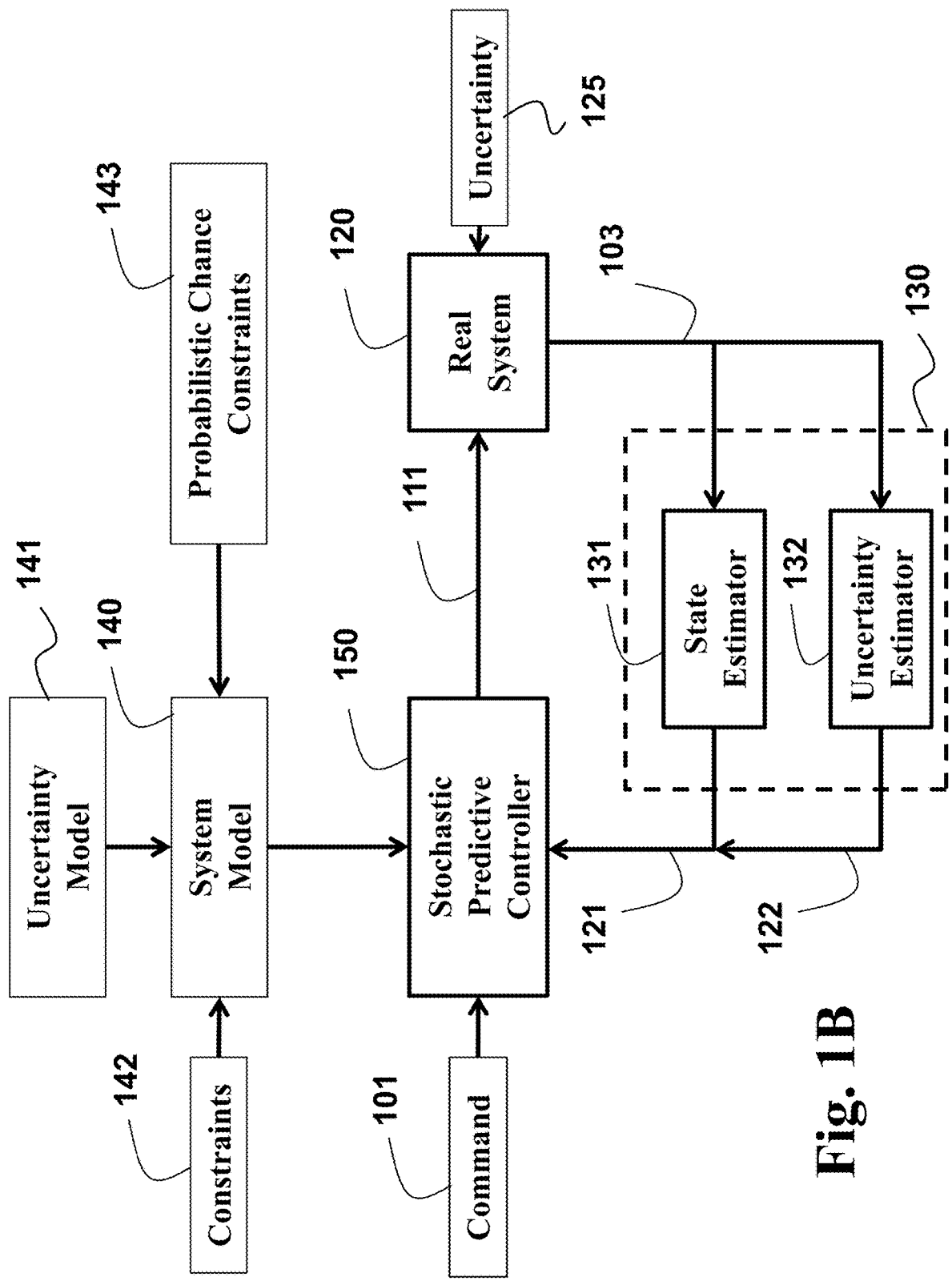
FIG. 1B is a block diagram of a stochastic predictive controller and feedback loop for a system with uncertainty according to some embodiments.

FIG. 1B shows an example system 120 with uncertainty 125, connected to a stochastic predictive controller 150 via a state estimator 131 and uncertainty estimator 132 according to some embodiments. In some implementations, the stochastic predictive controller is a stochastic model predictive controller (SMPC) programmed according to a dynamical model 140 of the system and uncertainty. The dynamic model includes an uncertainty model 141 to model the uncertainty 125 and its relation to the behavior of the system. The uncertainty model includes a model of the linear and/or nonlinear relations between the uncertainty and the dynamic model equations that describe the dynamic behavior of the system. In addition, the uncertainty model includes a model of the probability distributions for each of the time-varying uncertainties in the dynamic model.

In some embodiments of the invention, the dynamic model 140 for the stochastic predictive controller 150 can include one or multiple probabilistic chance constraints 143. Any of the physical limitations and specification constraints for the system can be formulated as one or multiple probabilistic chance constraints 143, which aim to enforce that the probability of violating the corresponding constraint is below a certain probability threshold value.

In some embodiments of the invention, the uncertainty estimator 132 provides estimates 122, e.g., of the first and higher order moments of the probability distribution for one or multiple of the uncertainties in the dynamic model 140 that is used by the stochastic predictive controller 150. In some embodiments of the invention, the state estimator 131 and uncertainty estimator 132 are implemented together in one estimator component 130, which at fixed or variable control period sampling intervals receives the outputs of the system 103 and determines, using the new and the previous output measurements, the estimated state 121 and estimated uncertainty 122 of the system 120 and uncertainty 125.

Figure 2A:
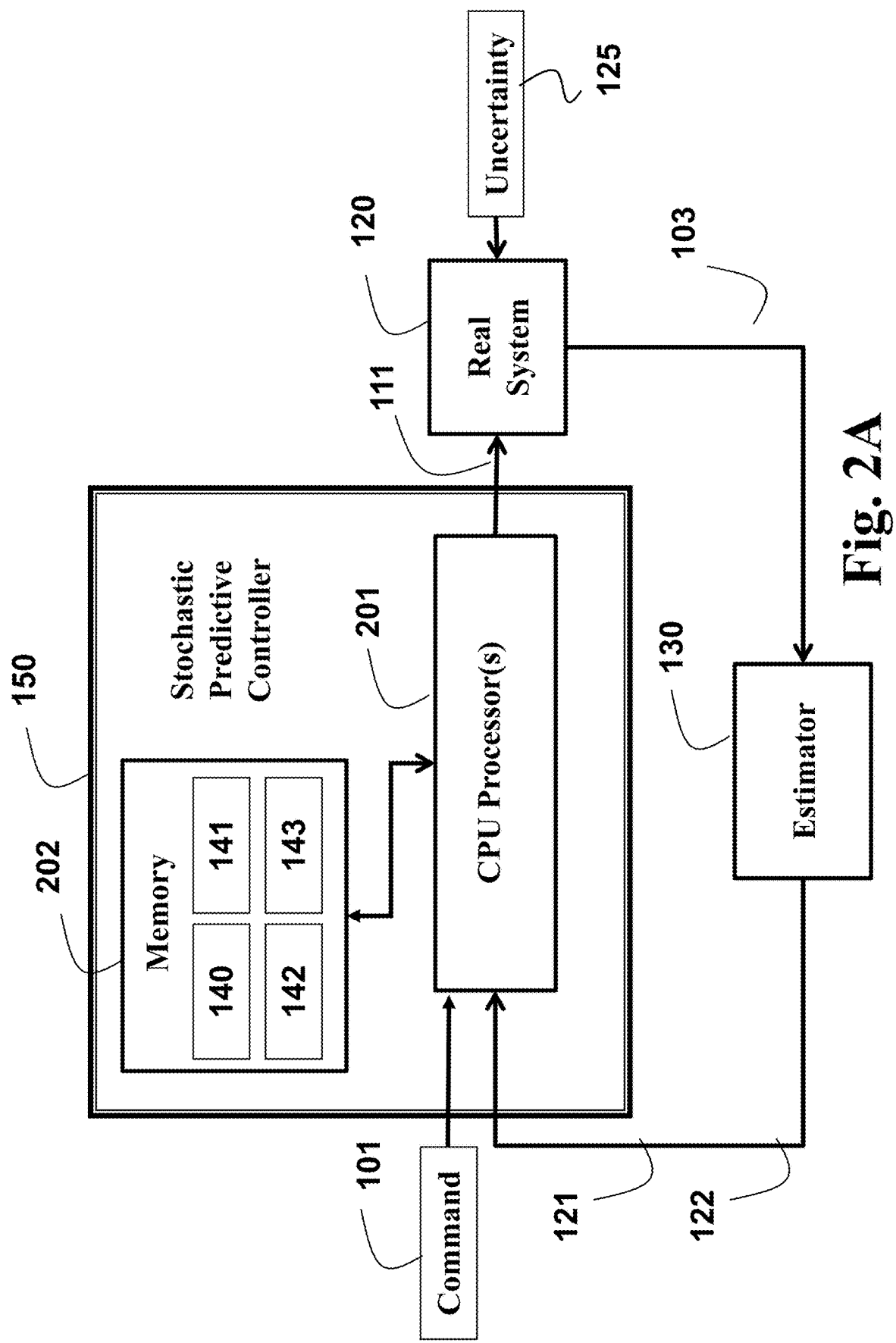
FIG. 2A is a block diagram of a controller, implemented using CPU processors and memory, and feedback system according to some embodiments of the invention.

FIG. 2A shows a block diagram of a stochastic predictive controller 150 according to some embodiments, which actuates the system such that the estimated state 121 of the system and output 103 follow a command 101, given the estimated uncertainty 122. The stochastic predictive controller 150 includes a computer, e.g., in the form of a single central processing unit (CPU) or multiple CPU processors 201 connected to memory 202 for storing the dynamic model 140, the uncertainty model 141, the constraints 142 and probabilistic chance constraints 143 on the operation of the real system 120 with uncertainty 125.

Figure 2B:
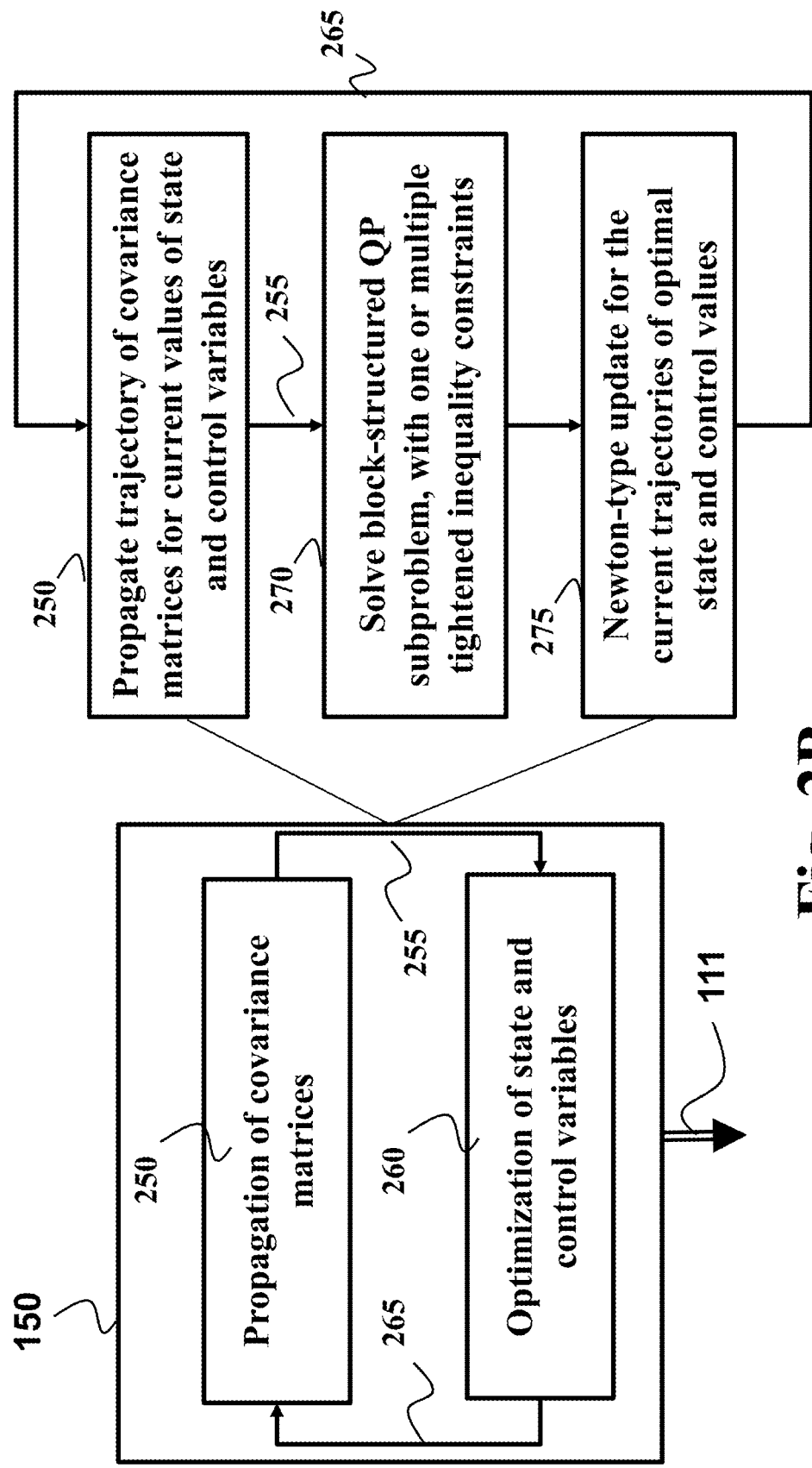
FIG. 2B is a block diagram of a two-level optimization that alternates propagation of covariance matrices with optimization of state and control variables in the stochastic predictive controller according to some embodiments.

FIG. 2B shows a block diagram of a two-level optimization procedure to solve the inequality constrained nonlinear dynamic optimization problem at each control step of the stochastic predictive controller 150, including probabilistic chance constraints representing the uncertainty to produce a control command. The two-level optimization procedure alternates propagation of covariance matrices 250 of the probabilistic chance constraints within the prediction horizon for fixed values of the state and control variables 265 with optimization of the state and control variables 260 within the prediction horizon for fixed values of the state covariance matrices 255. The control signal 111 is computed, once a termination condition is met for the two-level optimization procedure.

In some embodiments of the invention, the two-level optimization procedure 150 includes three stages or computational steps. The first step prepares the linear-quadratic objective function, computes the Jacobian matrices to prepare the linearized equality and inequality constraints and it propagates a trajectory of covariance matrices 250, which represent the uncertainty for the predicted state values over the control horizon, by evaluating the nonlinear covariance propagation equations for a current trajectory of state and control values 265. The second step consists of the solution of the resulting block-structured QP subproblem, with one or multiple tightened inequality constraints to approximate each of the chance constraints 270. The third and final step includes the Newton-type update for the current trajectories of optimal state and control values 275.

In some embodiments of the invention, adjoint gradient computations are used to correct inexact Jacobian information in the stochastic predictive controller and the resulting two-level optimization procedure consists of three main computational steps. The first step prepares the linear-quadratic objective function, computes the Jacobian matrices with respect to state and control variables to prepare the linearized equality and inequality constraints, it computes the adjoint-based gradient evaluation and numerically eliminates the covariance matrices from each of the objective and constraint functions by propagating a trajectory of covariance matrices 250 for a current trajectory of predicted state and control values 265. The second step consists of the solution of the resulting block-structured QP subproblem, with one or multiple tightened inequality constraints to approximate each of the chance constraints 270. The third and final step includes the Newton-type update for the trajectories of optimal state and control values 275, as well as an expansion of the corresponding update of Lagrange multipliers.

Figure 3A:
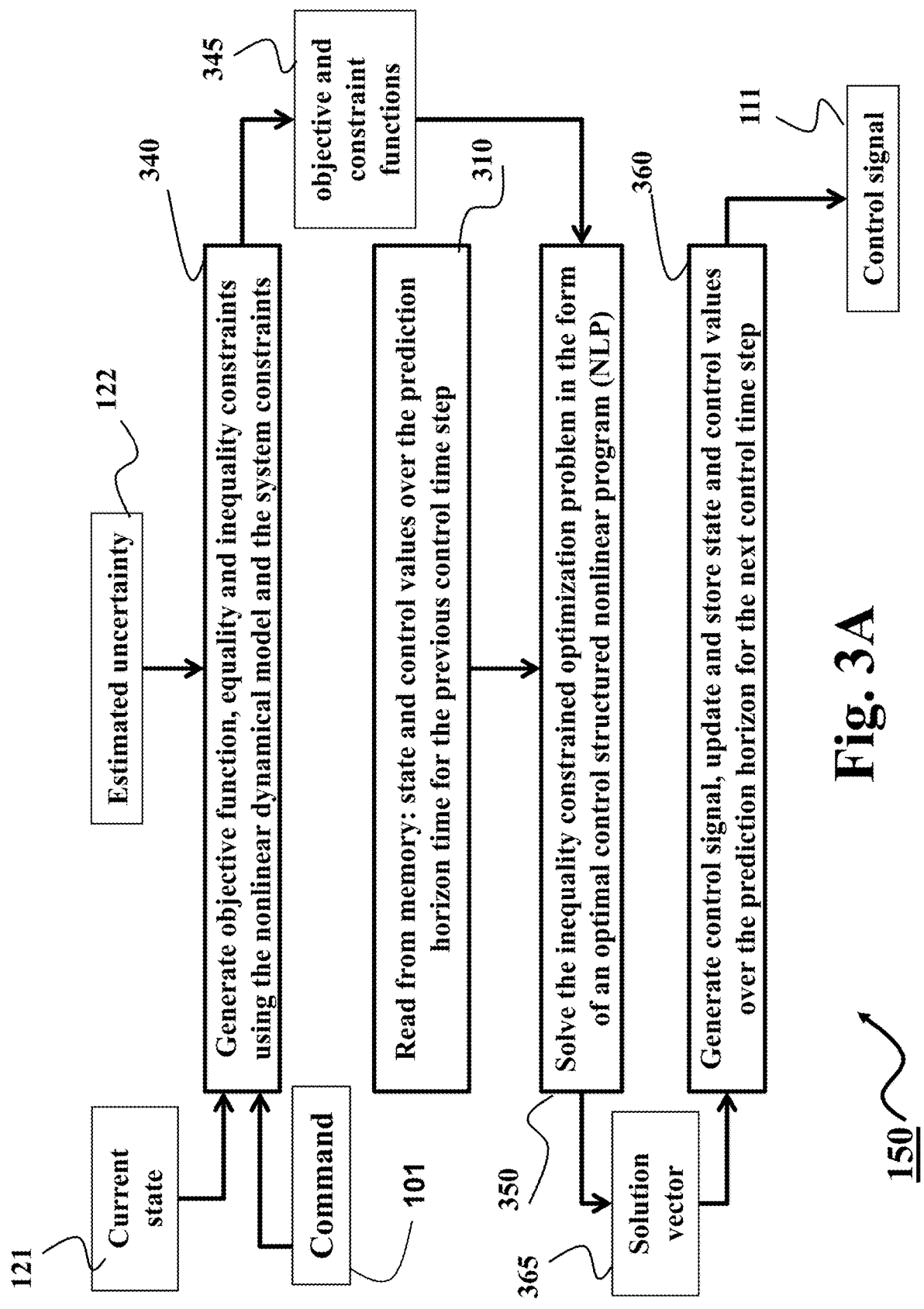
FIG. 3A is a block diagram of a stochastic nonlinear model predictive control (SNMPC) method to implement the controller according to some embodiments.

FIG. 3A shows a block diagram of a system and a method for stochastic nonlinear model predictive control (SNMPC) to implement the stochastic predictive controller 150 that computes the control signal 111, given the current state estimate of the system 121, uncertainty estimate 122 and the control command 101 according to some embodiments of the invention. Specifically, SNMPC computes a control solution, e.g., a solution vector 365 that includes a sequence of future optimal or approximately optimal control inputs over a prediction time horizon of the system 360, by solving a constrained optimization problem 350 at each control time step. The data 345 of the objective function, equality and inequality constraints in this optimization problem 350 depends on the dynamical model and system constraints 340, the current state estimate of the system 121, the estimated uncertainty 122 and the control command 101.

Embodiments of the invention use a direct optimal control method to formulate the continuous-time SNMPC problem as an inequality constrained nonlinear dynamic optimization problem. Some embodiments of the invention use a derivative-based optimization algorithm to solve the inequality constrained optimization problem 350 either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments of the invention are based on the realization that the inequality constrained optimization problem 350 has the form of an optimal control structured optimization problem (OCP), such that a structure exploiting implementation of a derivative-based optimization algorithm can be used to compute the solution vector 365 at each control time step.

In some embodiments of the invention, the solution of the inequality constrained optimization problem 350 uses the exact or approximate state and/or control values over the prediction time horizon from the previous control time step 310, which can be read from the memory, as a solution guess in order to reduce the computational effort of solving the inequality constrained optimization problem 350 at the current control time step. This concept of computing a solution guess from the solution information at the previous control time step 310 is called warm-starting or hot-starting of the optimization algorithm and it can reduce the required computational effort of the SNMPC controller in some embodiments of the invention. In a similar fashion, the corresponding solution vector 365 can be used to update and store a sequence of exact or approximate state and/or control values for the next control time step 360.

Figure 3B:
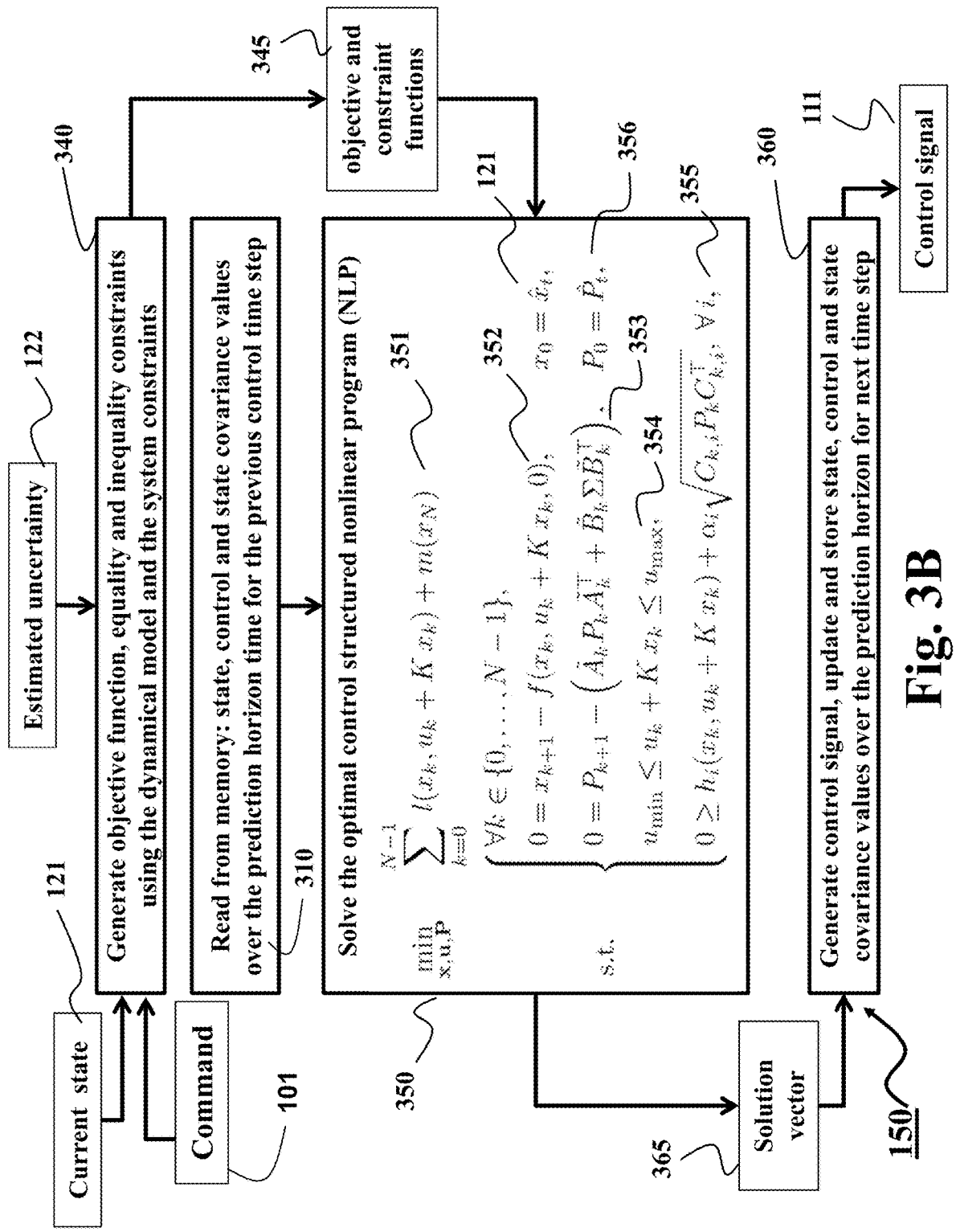
FIG. 3B is a block diagram of an SNMPC method that solves a direct optimal control structured Nonlinear Program (NLP), based on discrete-time system dynamics and covariance propagation equations, according to some embodiments.

FIG. 3B shows a block diagram of an SNMPC controller that solves a constrained optimal control structured nonlinear programming problem (OCP-NLP) 350 in order to compute the control signal 111 at each control time step, given the current state estimate of the system 121, the estimated uncertainty 122 and the control command 101. The OCP-NLP 350 includes the state variables $x=[x_0, x_1, \ldots, x_N]$, the state covariance matrix variables $P=[P_0, P_1, \ldots, P_N]$ and the control input variables $u=[u_0, u_1, \ldots, u_{N-1}]$ over the prediction time horizon as variables in the optimization problem that needs to be solved at each control time step:

$$\min_{x,u,P} \sum_{k=0}^{N-1} l(x_k, u_k + Kx_k) + m(x_N)$$

$$\text{s.t.} \begin{cases} \forall k \in \{0, \ldots, N-1\}, \\ 0 = x_{k+1} - f(x_k, u_k + Kx_k, 0), & x_0 = \hat{x}_t, \\ 0 = P_{k+1} - (\tilde{A}_k P_k \tilde{A}_k^\top + \tilde{B}_k \Sigma \tilde{B}_k^\top), & P_0 = \hat{P}_t, \\ u_{min} \leq u_k + Kx_k \leq u_{max}, \\ 0 \geq h_i(x_k, u_k + Kx_k) + \alpha_i \sqrt{C_{k,i} P_k C_{k,i}^\top}, & \forall i, \end{cases}$$

Some embodiments are based on the current state estimate 121 in an initial state value constraint $x_0 = \hat{x}_t$, a dynamical model of the system that results in linear and/or nonlinear equality constraints 352, a linearization-based approximation of the uncertainty propagation through the system dynamics resulting in linear and/or nonlinear covariance propagation equations 353, bounds on control inputs 354 and linear and/or nonlinear inequality constraints 355 and a linear-quadratic or nonlinear objective function 351, each of which are defined over the prediction time horizon in the optimal control structured optimization problem. The OCP-NLP data 345 of the objective function, equality and inequality constraints in this optimization problem 350 depends on the dynamical model and system constraints 340, the current state of the system 121, the estimated uncertainty 122 and the control command 101. Examples of the OCP-NLP data 345 include objective functions, e.g., l(•) and m(•) and constraint functions, e.g., f(•) and $h_i$(•). Other examples of the OCP-NLP data 345 include constraint vectors, e.g., $\hat{x}_t$, vec($\hat{P}_t$), $u_{min}$ and $u_{max}$ and matrices, e.g., $\tilde{A}_k$, $\tilde{B}_k$, K and $C_{k,i}$.

In some embodiments of the invention, the nonlinear equality constraints 352

$$x_{k+1} = f(x_k, u_k + Kx_k, 0)$$

impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, explicit or implicit Runge-Kutta methods, backward differentiation formulas or finite element methods. When the original dynamic model of the system is described by a set of continuous time differential equations, some embodiments of the invention discretize the system dynamics using an explicit or implicit numerical integration method 352 and the linearization requires a corresponding Jacobian evaluation to construct the discrete-time or discretized covariance propagation equations 353. In some embodiments of the invention, the initial state covariance matrix 356 is defined as $P_0 = \hat{P}_t$, where $\hat{P}_t$ denotes the state uncertainty corresponding to the current state estimate 121.

In some embodiments of the invention, the nonlinear inequality constraints 355 can be defined by any nonlinear smooth function, including either convex and/or non-convex constraints. In embodiments of the invention, one or multiple of the inequality constraints 355 can be defined as probabilistic chance constraints that aim to ensure that the probability of violating the corresponding inequality constraint is below a certain probability threshold value, i.e., the back-off coefficient value $\alpha_i > 0$ for probabilistic chance constraints and $\alpha_i = 0$ for standard deterministic inequality constraints. Note that deterministic inequality constraints aim to ensure that the corresponding inequality constraint is satisfied for the expected value of the trajectory of state and control values.

Using an approximate formulation of the probabilistic chance constraints 355, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints. In some embodiments of the invention, a stage and/or terminal cost in the objective function 351 can be defined by any linear, linear-quadratic and/or nonlinear smooth function, including either convex and/or non-convex functions. The objective function 351 of the optimal control problem can include a cost term corresponding to each of the time points of the prediction time horizon. In some embodiments, the objective function includes a (nonlinear) least squares type penalization of the deviation of a certain output function of the system from a sequence of reference output values at each of the time points of the prediction time horizon, resulting in a reference tracking type formulation of the cost function in the stochastic predictive controller 150.

Figure 4A:
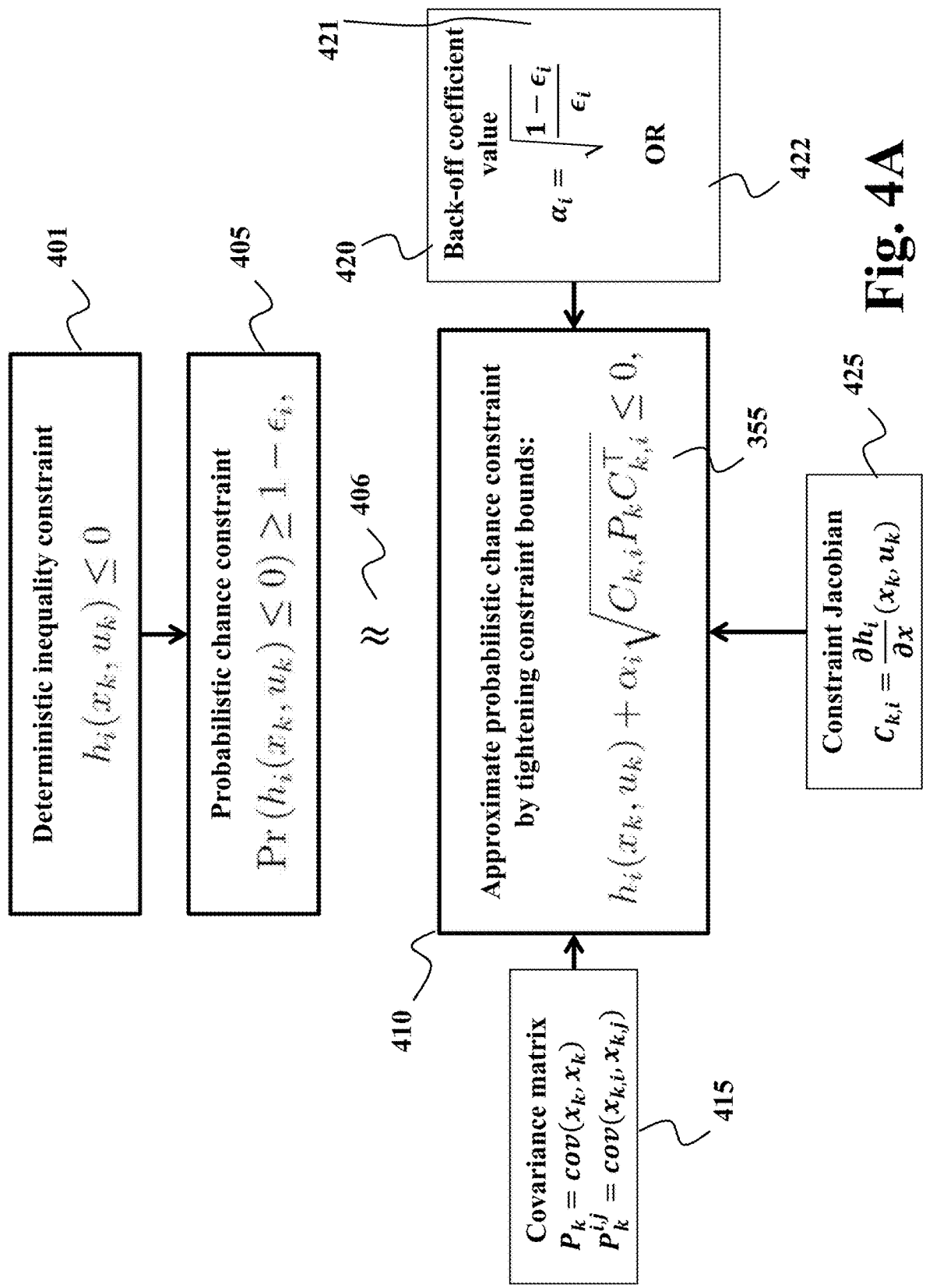
FIG. 4A is a block diagram of the approximation of probabilistic chance constraints in the stochastic predictive controller, according to some embodiments.

FIG. 4A shows a block diagram of formulating one or multiple deterministic inequality constraints 401, on one or multiple state and/or control input variables, as probabilistic chance constraints 405 and their approximation 406 by tightening the corresponding constraint bounds 410 in the constrained OCP formulation of the stochastic predictive controller. Probabilistic chance constraints aim to ensure that the probability of violating an inequality constraint $h_i(x_k,u_k) \le 0$ is below a certain probability threshold value $\epsilon_i$, i.e., $\Pr(h_i(x_k,u_k)>0) \le \epsilon_i$. Equivalently, probabilistic chance constraints aim to ensure that the probability of satisfying an inequality constraint $h_i(x_k,u_k) \le 0$ is above a certain probability threshold value $1-\epsilon_i$, i.e., $\Pr(h_i(x_k,u_k) \le 0) \ge 1-\epsilon_i$.

In some embodiments of the invention, the formulation of one or multiple probabilistic chance constraints is implemented approximately 406, using a constraint tightening procedure 410

$$h_i(x_k,u_k)+\alpha_i\sqrt{C_{k,i}P_k C_{k,i}^T} \le 0,$$

based on a state covariance matrix $P_k=\text{cov}(x_k, x_k)$ 415, a constraint Jacobian matrix $$C_{k,i} = \frac{\partial h_i}{\partial x}(x_k, u_k) \quad 425$$

and a back-off coefficient value $\alpha_i$ 420 that depends on the probability threshold value $\epsilon_i$, the probability distribution of the uncertainty and the resulting approximate probability distribution of the predicted state trajectories. The state covariance matrix $P_k$ can be computed using linearization-based covariance propagation equations 353. The constraint Jacobian matrix $C_{k,i}$ can be evaluated efficiently using symbolic differentiation or using algorithmic differentiation (AD) tools. In some embodiments of the invention, the back-off coefficient value $\alpha_i$ 420 in each of the tightened inequality constraints 355 can be computed using the Cantelli-Chebyshev inequality, i.e., $$\alpha_i = \sqrt{\frac{1-\epsilon_i}{\epsilon_i}} \quad 421,$$

which holds regardless of the underlying probability distributions but it may lead to a relatively conservative constraint bound tightening. Other embodiments of the invention are based on a less conservative approximation, assuming normally distributed state trajectories, such that the back-off coefficient value can be chosen as $\alpha_i=\sqrt{2}\,\text{erf}^{-1}(1-2\epsilon_i)$ 422, where $\text{erf}^{-1}(\cdot)$ denotes the inverse Gaussian error function.

Figure 4B:
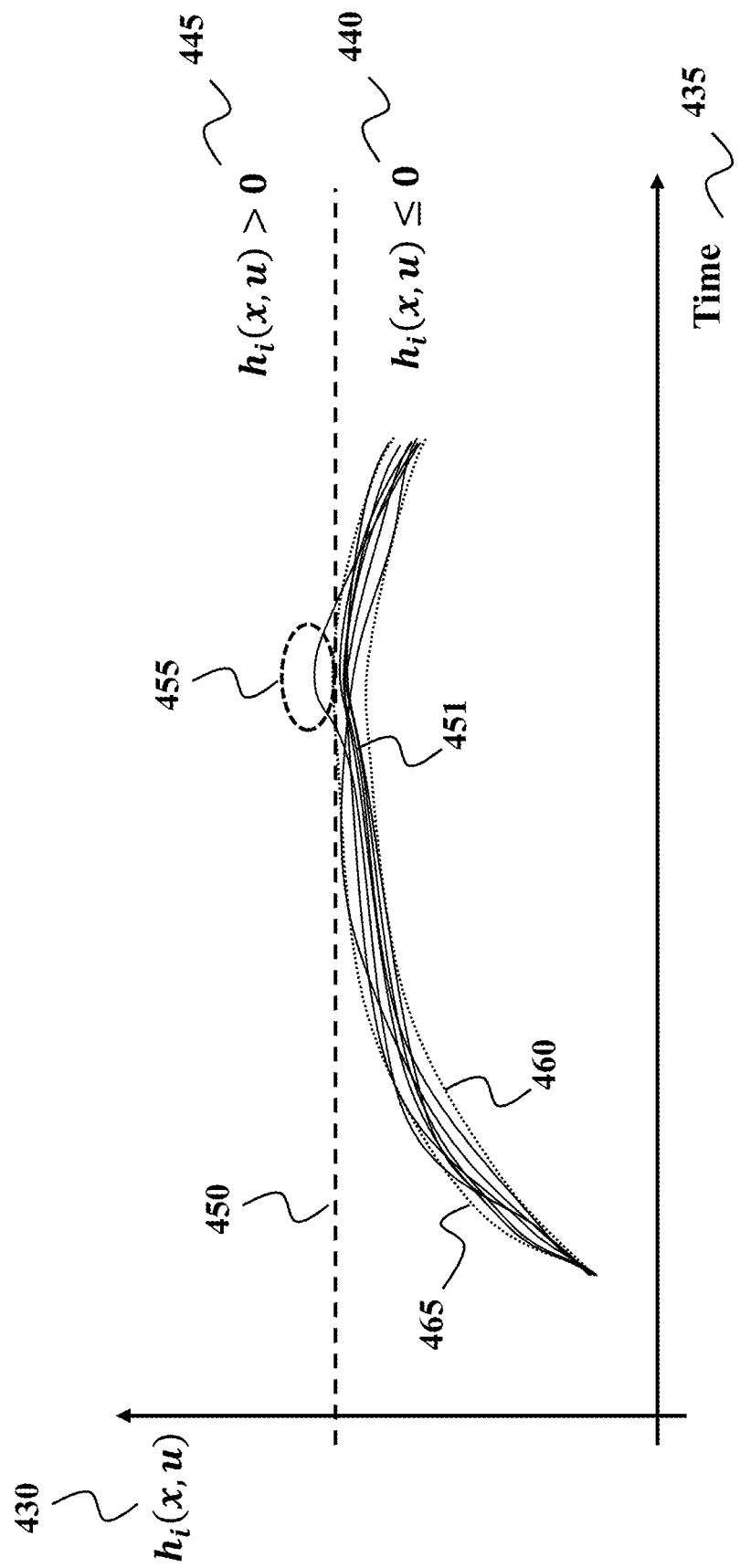
FIG. 4B shows an illustration of the idea behind the formulation and approximation of probabilistic chance constraints in the stochastic predictive controller.

FIG. 4B shows a sampled set of trajectories 451 of the constraint function value 430 over time 435, each of which correspond to a different uncertainty realization, and it shows a constraint bound 450 in order to illustrate a probabilistic chance constraint 405. Probabilistic chance constraints aim to ensure that the probability of violating an inequality constraint 445 is below a certain probability threshold value $\epsilon_i$, i.e., $\Pr(h_i(x_k, u_k)>0) \le \epsilon_i$. Equivalently, probabilistic chance constraints aim to ensure that the probability of satisfying an inequality constraint 440 is above $1-\epsilon_i$, i.e., $\Pr(h_i(x_k, u_k) \le 0) \ge 1-\epsilon_i$.

Sampling techniques characterize the stochastic system dynamics using a finite set of random realizations of uncertainties, which may lead to a considerable computational cost, due to a large number of samples that is often required for uncertainty propagation. Scenario-based methods exploit an adequate representation of the probability distributions, but the task of determining the number of scenarios leads to a tradeoff between robustness and computational efficiency. Therefore, embodiments of the invention are based on the realization that a direct but approximate propagation of uncertainty is needed to compute lower 460 and/or upper 465 bounds that represent a particular percentage of trajectories that are required to satisfy the inequality constraint $h_i(x_k,u_k) \ge 0$ in order to formulate probabilistic chance constraints in the stochastic predictive controller. In FIG. 4B, 455 denotes a trajectory that violates the inequality constraint and the probability of such a case should remain below a certain probability threshold value $\epsilon_i$ due to the use of probabilistic chance constraints in the stochastic predictive controller.

Figure 5A:
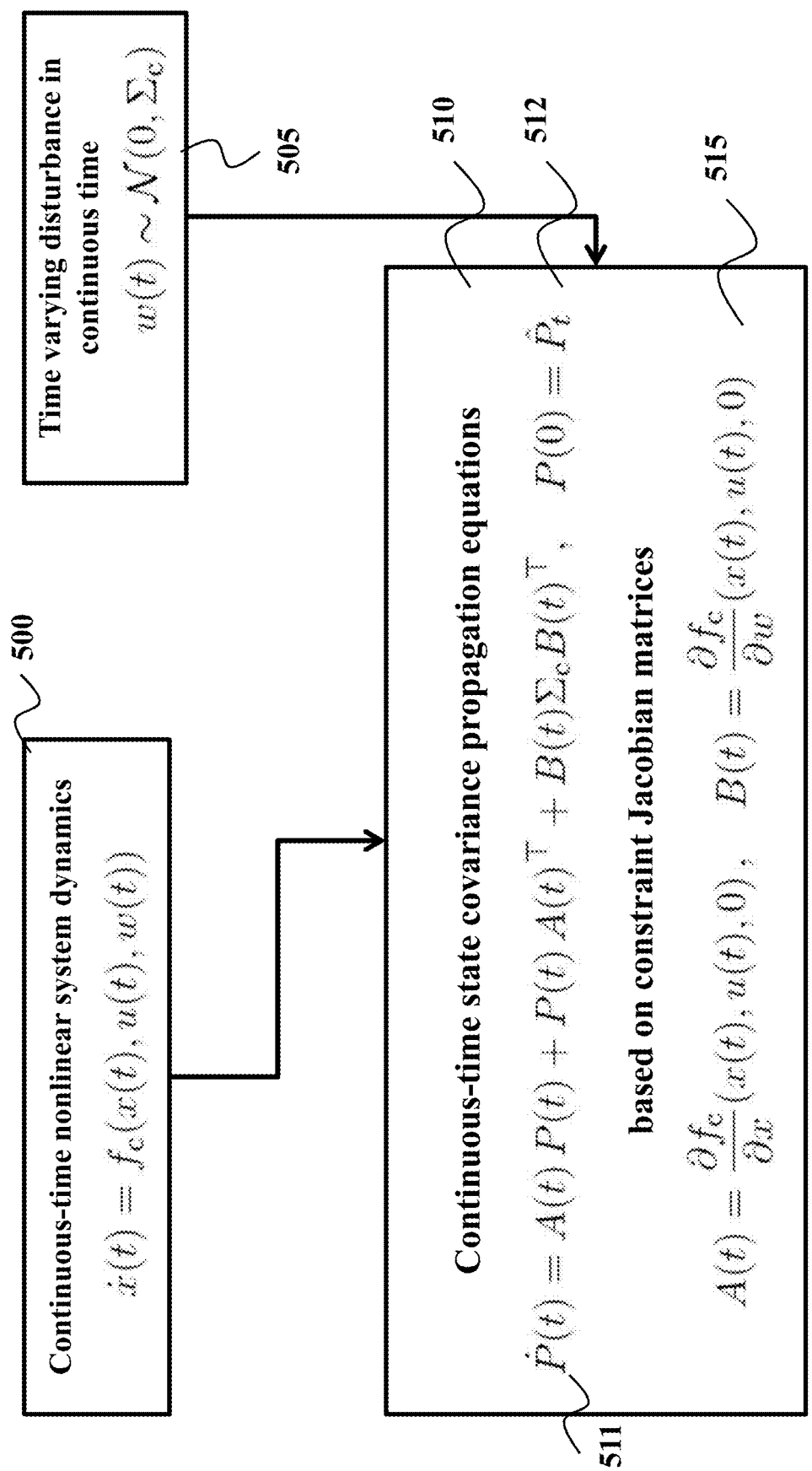
FIG. 5A is a block diagram illustrating a linearization-based state covariance propagation in continuous time, according to some embodiments.

FIG. 5A shows a block diagram to illustrate the linearization-based state covariance propagation for a set of continuous-time nonlinear system dynamics 500 $\dot{x}(t)=f_c(x(t), u(t), w(t))$ given a time-varying disturbance $w(t)$ 505. In some embodiments of the invention, the time-varying disturbance is modeled as a normally distributed set of stochastic variables $w(t) \sim N(0, \Sigma_c)$ in continuous time. The continuous-time state covariance propagation equations 510 then read as $$\dot{P}(t)=A(t)P(t)+P(t)A(t)^T+B(t)\Sigma_c B(t)^T, P(0)=\hat{P}_t$$

given the continuous-time constraint Jacobian matrices 515

$$A(t) = \frac{\partial f_c}{\partial x}(x(t), u(t), 0),$$

-continued $$B(t) = \frac{\partial f_c}{\partial w}(x(t), u(t), 0)$$

Figure 5B:
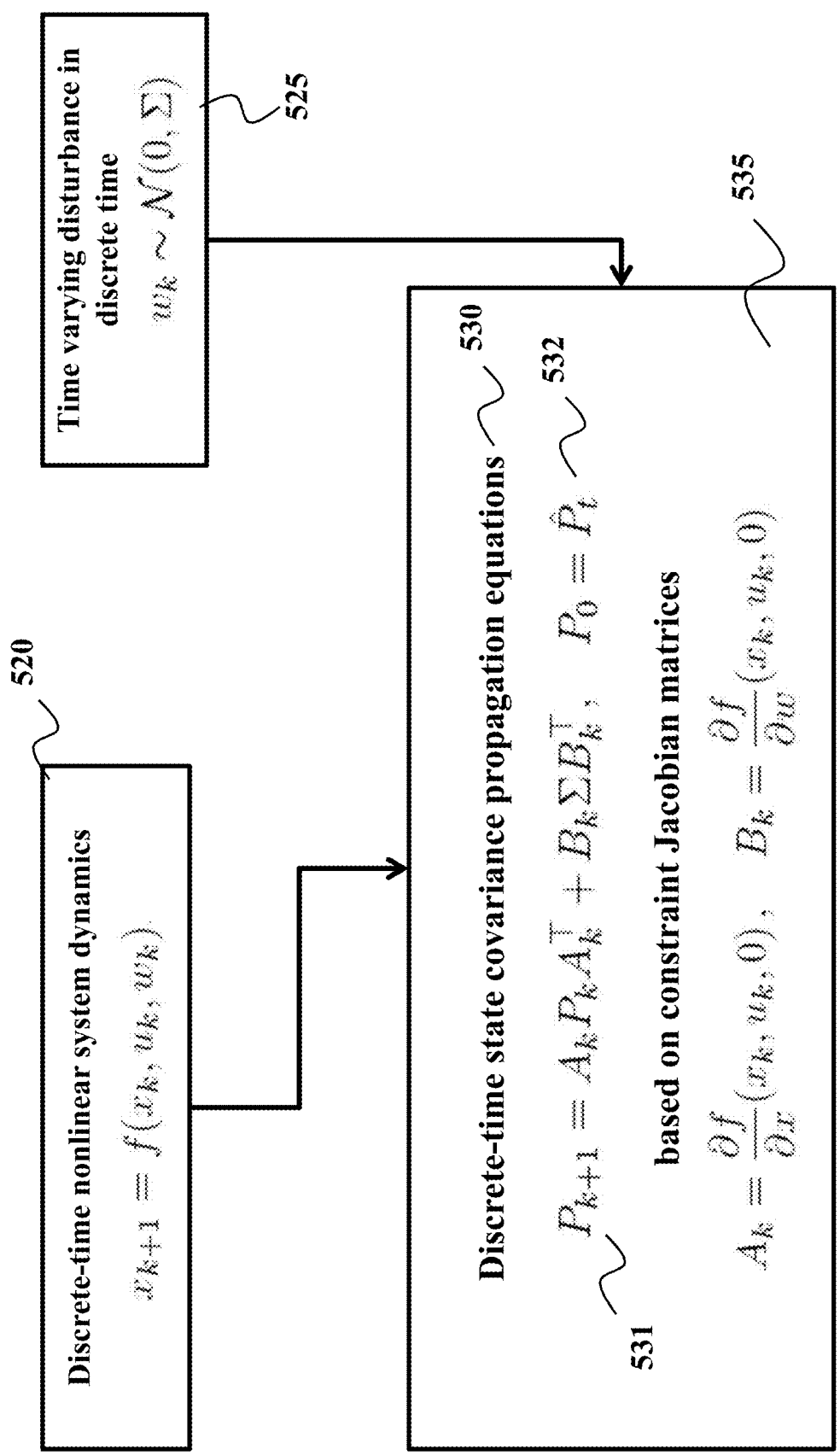
FIG. 5B is a block diagram illustrating a linearization-based state covariance propagation in discrete time, according to some embodiments.

Direct optimal control methods use a numerical integration method to discretize the continuous-time state covariance propagation equations 511, which results in a numerical approximation of the continuous-time trajectory of state covariance matrices. However, a sequence of numerically simulated state covariance matrices does not necessarily preserve positive definiteness of the state covariance matrix $P_k \succ$, $\forall k$, even if the initial state covariance matrix 512 is positive definite, i.e., $P_0 = \hat{P}_t \succ 0$. Some embodiments of the invention are based on the realization that the latter can lead to numerical issues in the derivative-based optimization algorithm for the stochastic predictive controller. FIG. 5B shows a block diagram to illustrate the linearization-based state covariance propagation for a set of discrete-time nonlinear system dynamics 520 $x_{k+1} = f(x_k, u_k, w_k)$ given a time-varying disturbance $w_k$ 525. In some embodiments of the invention, the time-varying disturbance is modeled as a normally distributed set of stochastic variables $w_k \sim N(0, \Sigma)$ in discrete time. The discrete-time state covariance propagation equations 530 then read as $$P_{k+1} = A_k P_k A_k^T + B_k \Sigma B_k^T, P_0 = \hat{P}_t$$

where $P_k = \text{cov}(x_k, x_k) \in \mathbb{R}^{n_x \times n_x}$ is the covariance matrix for the predicted state value $x_k$, and given the discrete-time constraint Jacobian matrices 535

$$A_k = \frac{\partial f}{\partial x}(x_k, u_k, 0),$$

$$B_k = \frac{\partial f}{\partial w}(x_k, u_k, 0)$$

Unlike the continuous-time state covariance propagation equations 511, some embodiments of the invention are based on the realization that the discrete-time state covariance propagation equations 531 do not require the use of a numerical integration method and they automatically preserve the positive definiteness of the state covariance matrix $P_k \succ 0$, $\forall k$, as long as the initial state covariance matrix 532 is positive definite, i.e., $P_0 = \hat{P}_t \succ 0$.

Figure 5C:
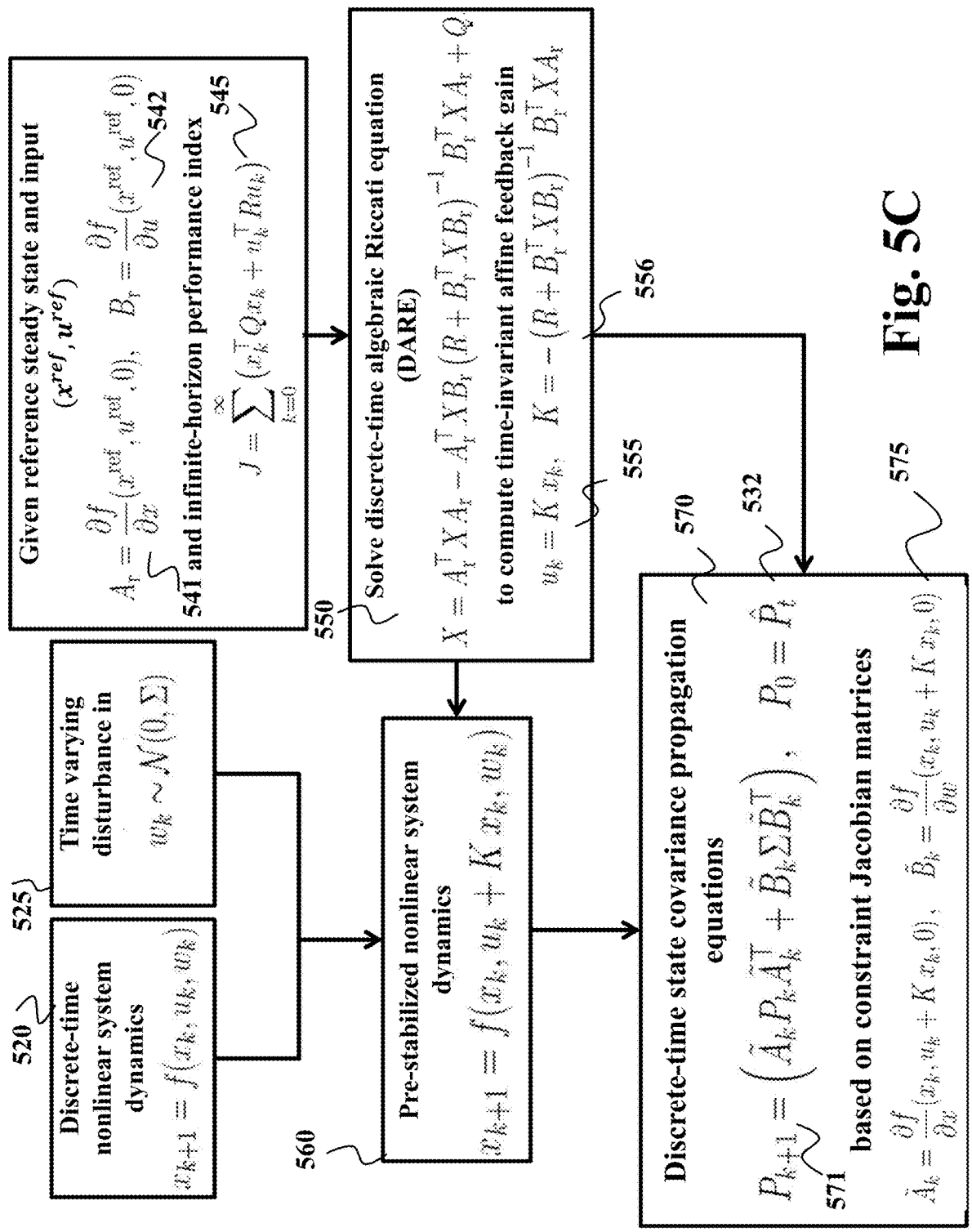
FIG. 5C is a block diagram illustrating a linearization-based state covariance propagation for pre-stabilized nonlinear system dynamics in discrete time, according to some embodiments.

FIG. 5C shows a block diagram to illustrate the pre-stabilization of the nonlinear system dynamics in order to take the feedback control action into account as part of the state covariance propagation for the stochastic predictive controller. Some embodiments are based on a parameterization of the feedback control action in order to formulate the pre-stabilized nonlinear system dynamics 560, given the discrete-time dynamics 520 and the time-varying disturbance 525.

In some embodiments of the invention, a linear-quadratic regulator is used to define a time-invariant affine feedback gain $u_k = K x_k$ 555 in order to formulate the pre-stabilized nonlinear system dynamics 560

$$x_{k+1} = f(x_k, u_k + K x_k, w_k)$$

where the overall control action is in the feedforward-feedback form $u_k + K x_k$ due to the pre-stabilizing controller gain K. For example, reference steady state and input values ($x^{ref}$, $u^{ref}$) can be used to define the reference constraint Jacobian matrices $A_r$ 541 and $B_r$ 542

$$A_r = \frac{\partial f}{\partial x}(x^{ref}, u^{ref}, 0),$$

$$B_r = \frac{\partial f}{\partial u}(x^{ref}, u^{ref}, 0)$$

in combination with the infinite-horizon performance index 545

$$J = \sum_{k=0}^{\infty} (x_k^T Q x_k + u_k^T R u_k)$$

to define a time-invariant affine feedback gain $u_k = K x_k$ 555. Some embodiments of the invention solve the discrete-time algebraic Riccati equation (DARE) 550

$$X = A_r^T X A_r - A_r^T X B_r (R + B_r^T X B_r)^{-1} B_r^T X A_r + Q.$$

to compute the time-invariant affine feedback gain as follows 556

$$u_k = K x_k, K = -(R + B_r^T X B_r)^{-1} B_r^T X A_r$$

where $Q \succ 0$ and $R \succ 0$ denote the weighting matrices in the infinite-horizon performance index 545. Based on the pre-stabilized nonlinear system dynamics 560, the discrete-time state covariance propagation equations 570 then read as $$P_{k+1} = (\tilde{A}_k P_k \tilde{A}_k^T + \tilde{B}_k \Sigma \tilde{B}_k^T), P_0 = \hat{P}_t$$

given the discrete-time constraint Jacobian matrices 575 for the pre-stabilized nonlinear system dynamics that read as $$\tilde{A}_k = \frac{\partial f}{\partial x}(x_k, u_k + K x_k, 0),$$

$$\tilde{B}_k = \frac{\partial f}{\partial w}(x_k, u_k + K x_k, 0)$$

In some embodiments of the invention, a time-varying trajectory of reference values ($x_k^{ref}$, $u_k^{ref}$) is used instead to define a time-varying trajectory of feedback control laws, e.g., a trajectory of affine feedback gains based on the same linear-quadratic regulator design formulas.

Figure 5D:
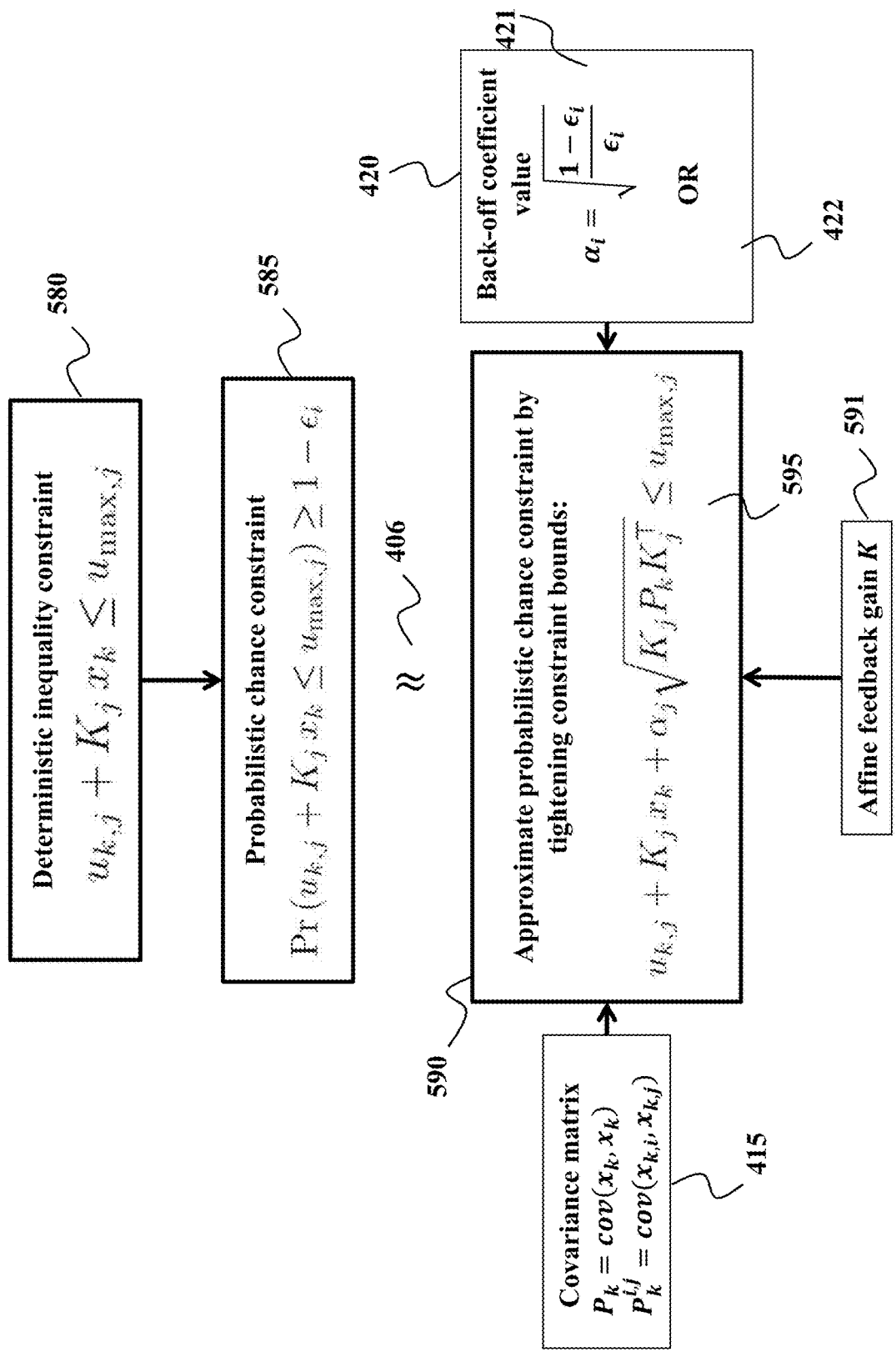
FIG. 5D is a block diagram of the formulation and approximation of control bounds as probabilistic chance constraints due to the state feedback control action, according to some embodiments of the invention.

FIG. 5D shows a block diagram of formulating one or multiple deterministic inequality constraints 580, for one or multiple of the control actions in feedforward-feedback form $u_k + K x_k$, as probabilistic chance constraints 585 and their approximation 406 by tightening the corresponding constraint bounds 590 in the constrained OCP formulation of the stochastic predictive controller, according to some embodiments. In some embodiments of the invention, the formulation of one or multiple probabilistic chance constraints is implemented approximately 406, using a constraint tightening procedure 595

$$u_{k,j} + K_j x_k + \alpha_j \sqrt{K_j P_k K_j^T} \le u_{max,j}$$

based on a state covariance matrix $P_k = \text{cov}(x_k, x_k)$ 415, an affine feedback gain matrix K 591 and a back-off coefficient value $\alpha_j$ 420 that depends on the probability threshold value $\in_j$, the probability distribution of the uncertainty and the resulting approximate probability distribution of the predicted state trajectories. The state covariance matrix $P_k$ can be computed using the linearization-based discrete-time state covariance propagation equations 571 for the pre-stabilized nonlinear system dynamics, given $P_0 = \hat{P}_t \succ 0$ 532.

Note that the feedback control actions in FIG. 5C and in FIG. 5D are predictions for the future feedback control actions over the prediction time horizon in the dynamic optimization problem at one control step, and therefore these feedback control actions should not be confused with the real feedback of the estimated state of the system 121 to the predictive controller 110 in FIG. 1.

Figure 6A:
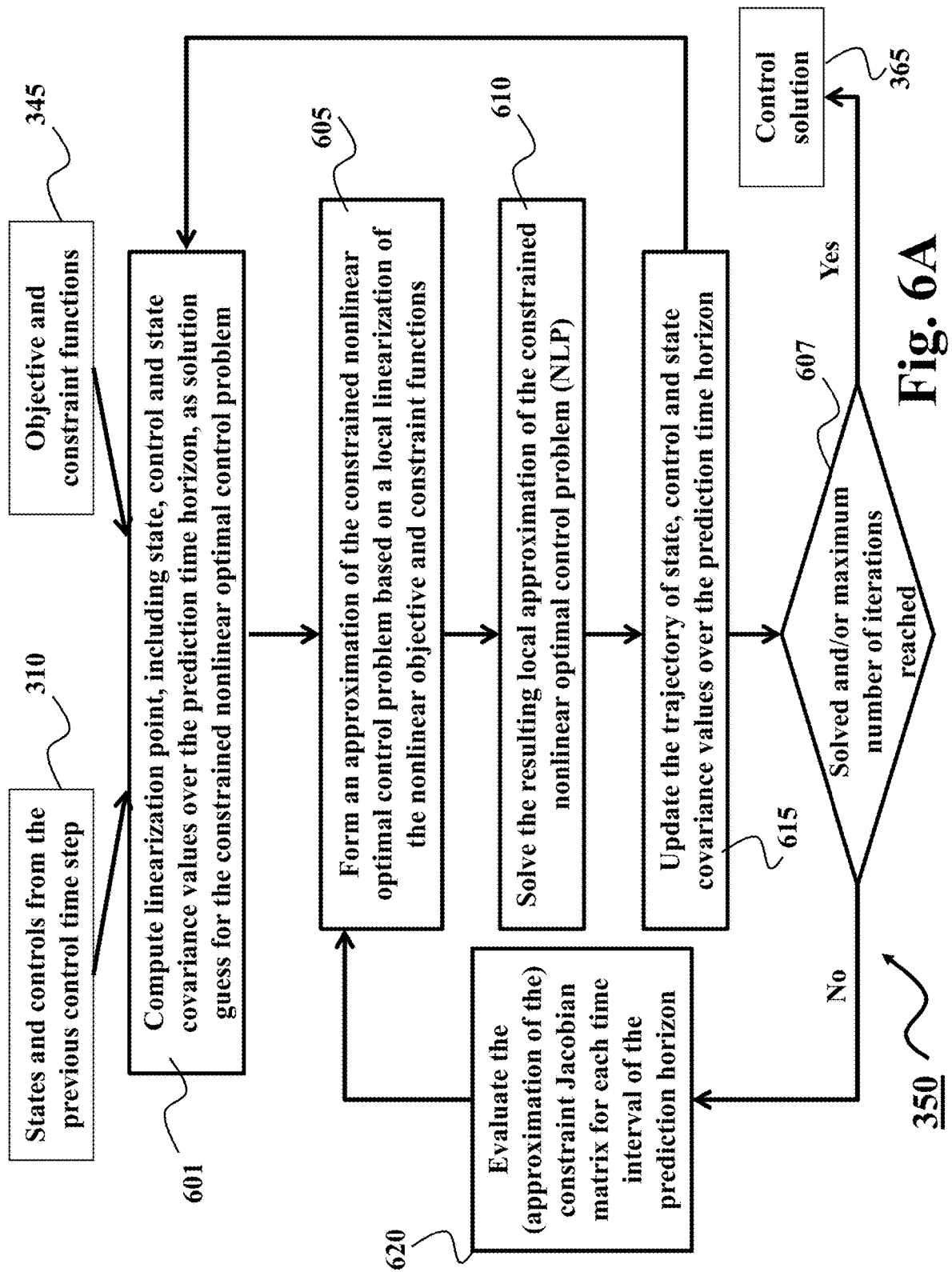
FIG. 6A is a block diagram of an iterative derivative-based optimization procedure to solve the constrained nonlinear optimal control problem at each time step in the stochastic predictive controller.

FIG. 6A shows a block diagram of an iterative derivative-based optimization procedure to solve the constrained, optimal control structured, nonlinear program (NLP) 350 at each control time step in the stochastic predictive controller via the use of successive local linearization-based approximations 605. A solution guess for the NLP 601 is used to construct this local approximation and the solution to the local approximation of the constrained NLP 610 is used to update the current sequence of state, control and state covariance values over the prediction time horizon 615, resulting in an update to the current solution guess for the constrained NLP 601 at each iteration of the algorithmic procedure. Each iteration of the optimization procedure checks whether the solution to the constrained NLP has been found and/or whether a maximum number of iterations has been reached 607. The control solution 365 has been found if the termination condition 607 is satisfied, otherwise (an approximation of) the constraint Jacobian matrix is evaluated 620 in order to construct the local linearization-based approximation 605 in the next iteration of the optimization algorithm. The state and control values from the previous control time step 310 can be used to form an initial solution guess and linearization point for the constrained NLP 601.

Based on the nonlinear objective and constraint functions 345 and using the current solution guess as a linearization point 601, including a trajectory of state, control and state covariance values over the prediction time horizon, a local approximation to the NLP 605 is constructed at each iteration of the algorithmic procedure. For this purpose, the constraint Jacobian matrix needs to be computed or approximated 620 in order to form a linearization of the discretized system of complex nonlinear system dynamics and/or nonlinear inequality constraints. In the case that the solution of the local approximation forms a sufficiently accurate solution for the NLP 607, then the optimal control solution 365 is obtained. A suboptimal and/or infeasible solution 365 is obtained when the maximum number of iterations is reached 607 instead. In the case where a solution to the NLP with sufficient accuracy is not yet found and the maximum number of iterations is not yet reached 607, then the solution to the local approximation 610 is used to update the trajectory of state, control and state covariance values over the prediction time horizon 615 and to update the solution guess to the NLP 601.

Different types of optimization algorithms can be used to solve the inequality constrained, optimal control structured, nonlinear program (NLP) 350 at each control time step via the use of successive local approximations 605. Some embodiments are based on sequential quadratic programming (SQP), in which a quadratic program (QP) is constructed and solved in each iteration as a local approximation to the original NLP. Instead, some embodiments are based on an interior point (IP) method where each local approximation is a linearization of the first order necessary conditions of optimality for the NLP in which the complementarity conditions, corresponding to the inequality constraints, are generally smoothened. In some embodiments, a barrier function is used to iteratively enforce the inequality constraints and each iteration constructs and solves a local approximation to the barrier reformulated problem.

Derivative-based optimization algorithms can use different Newton-type approximation techniques for the constraint Jacobian and Hessian matrices when constructing 605 and solving 610 the local subproblem in each iteration. Some embodiments are based on the exact linearization of some or all of the constraint functions by computing the exact constraint Jacobian matrix 620. Some embodiments instead use a quasi-Newton type update formula to iteratively update an approximation to the constraint Jacobian matrix via low-rank update techniques. Similarly, for the Lagrangian Hessian matrix of the NLP, also different Newton-type approximation techniques can be used. Some embodiments are based on an evaluation of the exact Hessian matrix for the Lagrangian when constructing each local approximation to the NLP. Some embodiments instead use a quasi-Newton type update formula to iteratively update an approximation to the Hessian matrix via symmetric low-rank update techniques. In case the objective function of the NLP includes a (nonlinear) least squares type cost term, some embodiments are based on a Gauss-Newton type Hessian approximation instead.

FIG. 6B shows a more compact NLP formulation 630 that is equivalent 625 to the optimal control structured optimization problem 350

$$\min_{y,z} \frac{1}{2}\|L(y)\|_2^2$$

$$\text{s.t.} \begin{cases} 0 = F(y), \\ 0 = E(y, z), \\ 0 \geq I(y, z) \end{cases}$$

which needs to be solved at each control time step in the stochastic predictive controller. The compact NLP formulation 630 refers to the state and control variables over the prediction time horizon as y 636 and refers to the covariance matrix variables as z 637

$$y = [x_0^T, u_0^T, \ldots, x_{N-1}^T, u_{N-1}^T, x_N^T]^T$$

$$z = [\text{vec}(P_0)^T, \ldots, \text{vec}(P_{N-1})^T, \text{vec}(P_N)^T]^T$$

such that the discrete-time nonlinear system dynamics and the discrete-time linearization-based covariance propagation equations can be defined, respectively, as 0=F(y) 632 and 0=E(y,z) 633

$$F(y) := \begin{bmatrix} x_0 - \hat{x}_t \\ \vdots \\ x_N - f(x_{N-1}, u_{N-1} + Kx_{N-1}, 0) \end{bmatrix},$$

$$E(y, z) := \begin{bmatrix} P_0 - \hat{P}_t \\ \vdots \\ P_N - (\tilde{A}_{N-1} P_{N-1} \tilde{A}_{N-1}^T + \tilde{B}_{N-1} \sum \tilde{B}_{N-1}^T) \end{bmatrix}$$

Figure 6C:
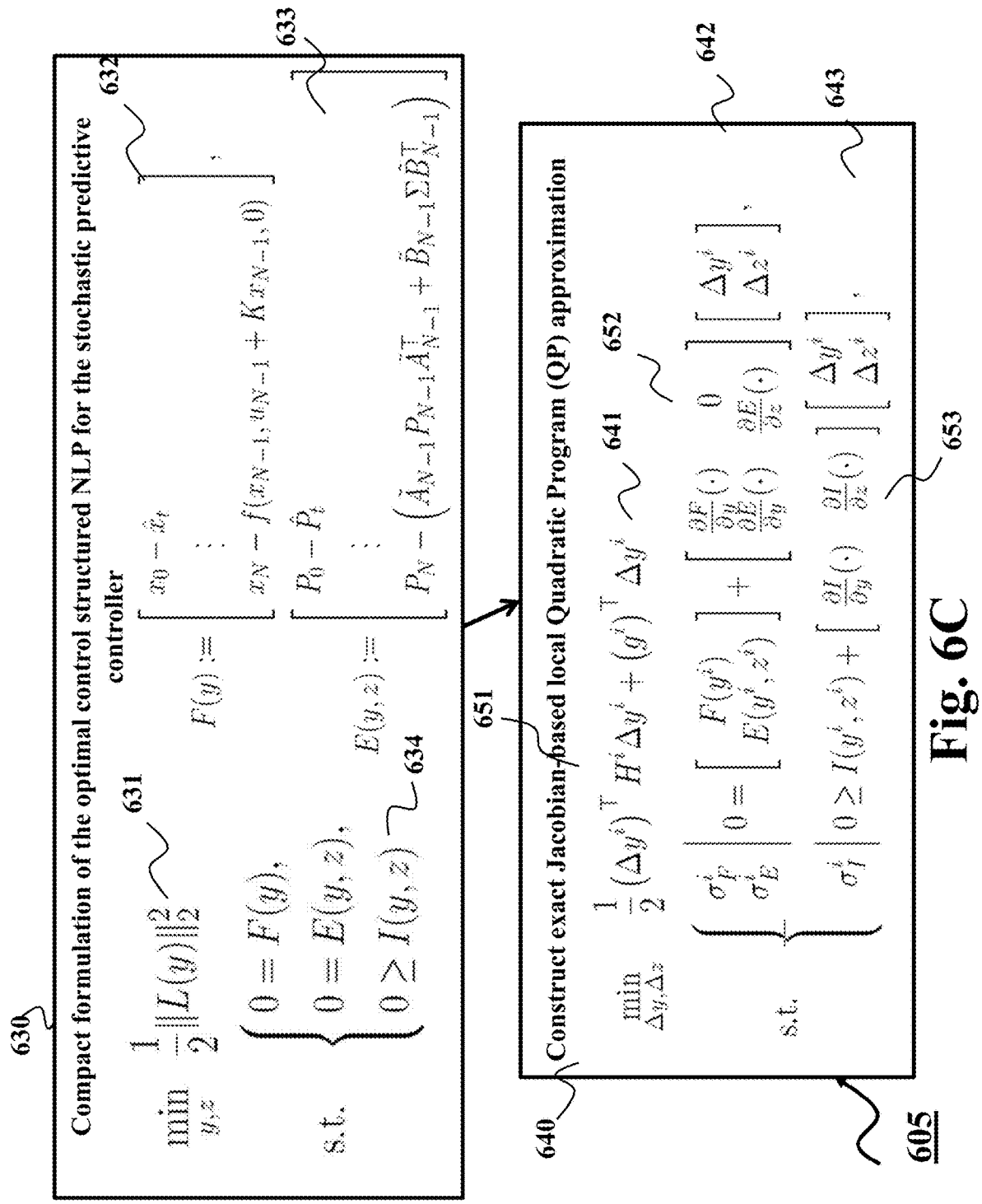
FIG. 6C is a block diagram of an exact Jacobian-based local quadratic program (QP) approximation of the optimal control structured NLP in the stochastic predictive controller, according to some embodiments of the invention.

Some embodiments of the invention are based on the realization that each of the state covariance matrices represents a symmetric matrix, such that a vectorized form $$\text{vec}(P_k) \in \mathbb{R}^{\frac{n_x(n_x+1)}{2}}$$

can be used to define z 637 instead to reduce the computational complexity and memory requirements of the stochastic predictive controller. In addition, the compact NLP formulation 630 can include one or multiple linear and/or nonlinear inequality constraints 634, including both deterministic and approximated probabilistic chance constraints, as well as a linear-quadratic or nonlinear objective function 631. In some embodiments of the invention, the objective function is defined as a least squares function $\frac{1}{2}\|L(y)\|_2^2$ 631, in which the linear or nonlinear function L(y), for example, can refer to the deviation of a certain output function of the system from a sequence of reference output values at each of the time points in the prediction time horizon. FIG. 6C shows a block diagram of an exact Jacobian-based quadratic program (QP) 640 that forms a local approximation 605 of the optimal control structured NLP 630, according to some embodiments based on sequential quadratic programming to implement the stochastic predictive controller. The linear equality constraint 642 in the QP subproblem corresponds to the linearization of the discrete-time system dynamics 632 and of the covariance propagation equations 633 based on an evaluation of the complete constraint Jacobian matrix 652. In addition, a local linearization 643 is needed for the inequality constraints 634 in the original NLP formulation, for which an exact Jacobian matrix needs to be evaluated for each of the nonlinear inequality constraints.

The linear-quadratic objective 641 in the optimal control structured QP 640 locally approximates the nonlinear objective 631. As mentioned earlier, the Hessian matrix $H^i$ 651 can be based either on an exact evaluation of the Hessian of the Lagrangian, or using a quasi-Newton type update formula or a Gauss-Newton Hessian approximation for each interval of the prediction time horizon. In some embodiments of the invention, a Gauss-Newton Hessian approximation is used for the nonlinear least squares objective function 631 as follows $$H^i = \frac{\partial L}{\partial y}(y^i)^T \frac{\partial L}{\partial y}(y^i) \approx \nabla^2 \Lambda(y^i, z^i, \lambda^i, \mu^i, \kappa^i)$$

in which the Lagrangian for the NLP is defined as follows $$\Lambda(\cdot) := \tfrac{1}{2}\|L(y)\|_2^2 + \lambda^T F(y) + \mu^T E(y,z) + \kappa^T I(y,z)$$

and the vector $g^i$ is accordingly defined as the gradient of the nonlinear least squares objective function 631 as follows $$g^i = \frac{\partial L}{\partial y}(y^i)^T L(y^i)$$

in which $y^i$ and $z^i$, respectively, denote the current values for the state and control variables and for the state covariance matrix variables over the prediction time horizon in the $i^{th}$ iteration of the SQP optimization algorithm. In some embodiments of the invention, the objective function 631 depends additionally on one or multiple elements of state covariance matrix variables in z 637, such that the Hessian and gradient evaluations depend on both $y^i$ and $z^i$. Some embodiments of the invention are based on the realization that the Hessian matrix 651, the equality constraint Jacobian matrix 652 and the inequality constraint Jacobian matrix 653 exhibit a block-structured sparsity, due to the separable objective function 351, the stage-wise individual inequality constraints 354-355 and the stage-wise coupling between state and covariance matrix variables at subsequent stages over the prediction time horizon in the equality constraints 352-353 of the constrained NLP 350. Therefore, in some embodiments of the invention, a block-sparse structure exploiting optimization algorithm can be used to solve 610 each local QP approximation 640 of the optimal control structured NLP 630 in an SQP optimization algorithm to implement the stochastic predictive controller. Examples of block-sparse structure exploiting QP optimization algorithms include primal, dual or primal-dual active-set methods, interior point methods, projected gradient methods, forward-backward splitting methods or the alternating direction method of multipliers (ADMM).

In some embodiments of the invention, one or multiple of the nonlinear inequality constraints 634 can be locally approximated by one or multiple nonlinear but convex inequality constraints, resulting in a local convex program (CP) approximation 605 that needs to be solved 610 in a sequential convex programming (SCP) implementation of the stochastic predictive controller. For example, in some embodiments, one or multiple probabilistic chance constraints can be locally approximated by convex second-order cone constraints and/or convex quadratic inequality constraints. Each of the convex conic constraints impose that a linear combination of state, control and/or covariance matrix variables is restricted to be inside of a convex cone. Examples of a convex cone can include the positive orthant, the set of positive semidefinite matrices and/or the second-order cone. Some embodiments of the invention are based on the realization that the local convex program approximation 605 of the optimal control structured constrained NLP 350 can be a linear program (LP), a quadratic program (QP), a quadratically constrained quadratic program (QCQP), a second-order cone program (SOCP) or a semidefinite program (SDP), and each of these classes of problems can be solved by a structure exploiting convex optimization algorithm.

Some embodiments of the invention are based on the realization that a linearization for the covariance propagation equations 633, in each iteration of a Newton-type SQP optimization algorithm, requires the evaluation of higher order derivatives for the nonlinear system dynamics, which forms a computationally expensive step in case the dynamics are highly dimensional, in case they involve lengthy nonlinear expressions or if they are described by a set of stiff or implicitly defined differential equations. More specifically, an evaluation of the constraint Jacobian matrix $$\frac{\partial E}{\partial y}(\cdot)$$

in 652 requires the evaluation of higher order derivatives for the nonlinear system dynamics f(•) in 632, due to the dependency of the covariance propagation equations 633 on the Jacobian matrices $$\tilde{A}_k = \frac{\partial f}{\partial x}(x_k, u_k + Kx_k, 0), \quad \tilde{B}_k = \frac{\partial f}{\partial w}(x_k, u_k + Kx_k, 0)$$

such that an evaluation of $$\frac{\partial E}{\partial y}(\cdot)$$

in 652 forms a computationally expensive step in the implementation of the stochastic predictive controller. Therefore, some embodiments of the invention are based on a Jacobian approximation technique in an inexact SQP optimization algorithm that avoids the evaluation of the constraint Jacobian matrix $$\frac{\partial E}{\partial y}(\cdot)$$

in 652 and therefore avoids the evaluation of higher order derivatives for the nonlinear system dynamics f(•) in 632.

Figure 7A:
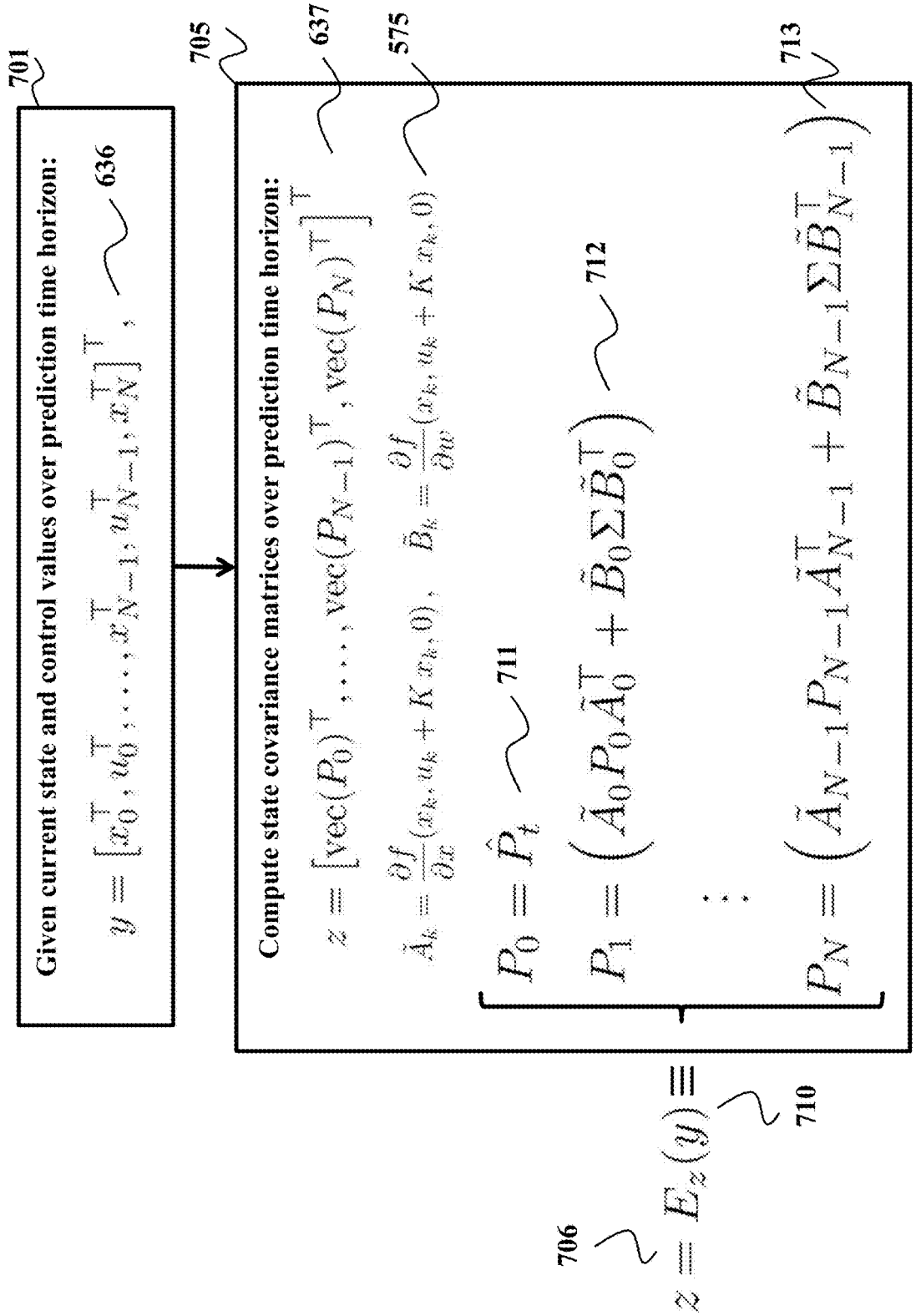
FIG. 7A is a block diagram of an explicit and sequential computation of the state covariance matrix values, given the current state and control values over the prediction time horizon, according to some embodiments.
Figure 7B:
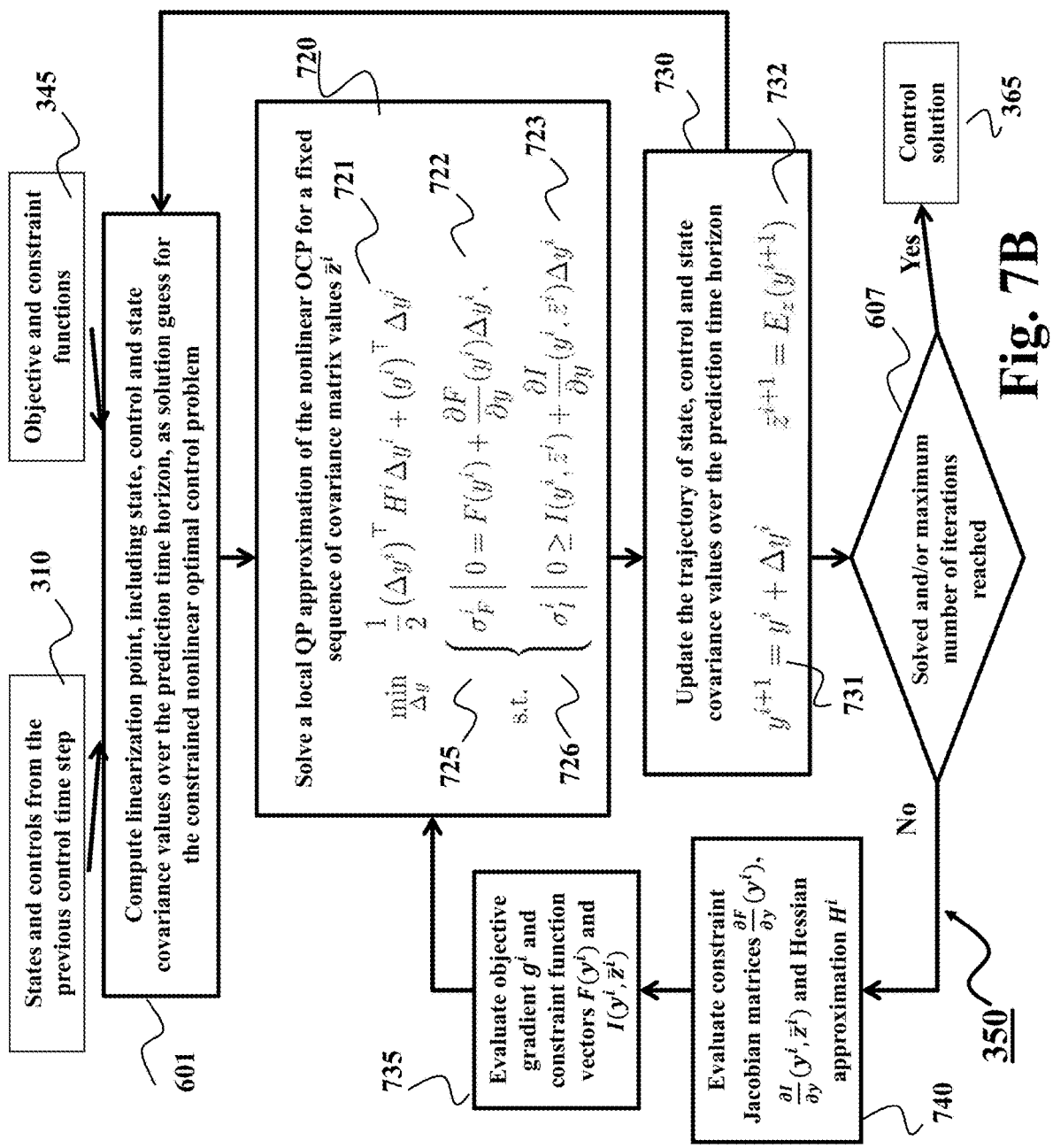
FIG. 7B is a block diagram of an iterative inexact SQP optimization algorithm for the efficient implementation of the stochastic predictive controller without the need to evaluate higher order derivatives of the nonlinear system dynamics.

FIG. 7A shows a block diagram of the computation of a trajectory of state covariance matrices over the prediction time horizon 705, using the discrete-time linearization-based covariance propagation equations 633 and given current state and control values in y 636 over the prediction time horizon 701. The computation 705 requires an evaluation of the constraint Jacobian matrices 575 for each interval k=0, . . . , N−1 in the prediction time horizon. The initial state covariance matrix $P_0 = \hat{P}_t \succ 0$ 711 is given or estimated, such that $P_1$ can be evaluated 712 given $P_0$, $\tilde{A}_0$, $\tilde{B}_0$ and covariance $\Sigma$ and these operations are repeated sequentially for k=0, . . . , N−1 until the end of the prediction time horizon 713, while preserving the positive definiteness for each state covariance matrix. This explicit and sequential evaluation of the covariance matrix values z 637 over the prediction time horizon is equivalent 710 to the compact notation $z=E_z(y)$ 706. FIG. 7B shows a block diagram of an inexact SQP optimization algorithm for the efficient implementation of the stochastic predictive controller according to some embodiments of the invention. The derivative-based iterative optimization procedure avoids the evaluation of the constraint Jacobian matrix $$\frac{\partial E}{\partial y}(\cdot)$$

in 652 and therefore avoids the evaluation of higher order derivatives for the nonlinear system dynamics f(•) in 632. More specifically, some embodiments of the invention solve a local QP approximation of the nonlinear OCP for a fixed sequence of covariance matrix values $\bar{z}^i$ 720 as follows $$\min_{\Delta y} \frac{1}{2}(\Delta y^i)^T H^i \Delta y^i + (g^i)^T \Delta y^i$$

$$\text{s.t.} \begin{cases} \sigma_F^i \mid 0 = F(y^i) + \frac{\partial F}{\partial y}(y^i)\Delta y^i, \\ \sigma_I^i \mid 0 \geq I(y^i, \bar{z}^i) + \frac{\partial I}{\partial y}(y^i, \bar{z}^i)\Delta y^i \end{cases}$$

which includes only state and control deviation variables as optimization variables $$\Delta y = [\Delta x_0^T, \Delta u_0^T, \ldots, \Delta x_{N-1}^T, \Delta u_{N_1}^T, \Delta x_N^T]^T$$

and therefore considerably reduces the computational complexity and memory requirements for an implementation of the inexact SQP optimization algorithm in the stochastic predictive controller.

Unlike the exact Jacobian-based QP approximation 640, the inexact QP approximation 720 for the nonlinear OCP in FIG. 7B includes a linearization of the nonlinear system dynamics in the equality constraints 722 and a linearization of the nonlinear inequality constraints for a fixed sequence of covariance matrix values $\bar{z}^i$ in the inequality constraints 723 of the QP approximation. The optimal Lagrange multiplier values for the equality and inequality constraints are, respectively, denoted as a $\sigma_F^i$ 725 and $\sigma_I^i$ 726 for the local QP solution in the $i^{th}$ iteration of the inexact SQP optimization algorithm.

Some embodiments of the invention are based on the realization that the linear-quadratic objective function 721 is equivalent to the objective function 641 for the exact Jacobian-based QP approximation 640, if the objective function does not depend directly on the state covariance matrix variables in z 637. In other embodiments, the linear-quadratic objective function 721 is an inexact approximation for a fixed sequence of covariance matrix values $\bar{z}^i$.

A solution guess for the NLP 601 is used to construct and solve the local QP approximation 720 in order to update the current sequence of state, control and state covariance values over the prediction time horizon 730 as $y^{i+1}=y^i+\Delta y^i$ 731 and $\bar{z}^{i+1}=E_z(y^{i+1})$ 732, where $\Delta y^i$ denotes the solution of primal optimization variables for the local QP approximation 720 and $\bar{z}^{i+1}=E_z(y^{i+1})$ denotes the explicit and sequential evaluation of the covariance matrix values over the prediction time horizon 705. In some embodiments of the invention, globalization strategies are used to ensure convergence of the Newton-type optimization algorithm such as, for example, the use of a modified update $y^{i+1}=y^i+\alpha^i\Delta y^i$ 731 in which the step size $\alpha^i$ can be selected based on a line search procedure in combination with a particular merit function for constrained optimization. Other embodiments of the invention use a trust region method to ensure convergence of the Newton-type optimization algorithm.

Each iteration of the optimization procedure checks whether the solution to the constrained NLP has been found and/or whether a maximum number of iterations has been reached 607. The (approximately) optimal and/or feasible control solution 365 has been found if the termination condition 607 is satisfied, otherwise the procedure needs to evaluate the constraint Jacobian matrices $$\frac{\partial F}{\partial y}(y^i), \frac{\partial I}{\partial y}(y^i, \bar{z}^i)$$

and Hessian approximation $H^i$ 740 as well as the objective gradient $g^i$ and constraint function vectors $F(y^i)$ and $I(y^i, \bar{z}^i)$ 735 in order to construct the local QP approximation 720 in the next iteration of the inexact SQP optimization algorithm. The state and control values from the previous control time step 310 can be used to form an initial solution guess and linearization point for the constrained nonlinear optimal control problem 601.

Some embodiments of the invention are based on the realization that the inexact SQP optimization algorithm in FIG. 7B avoids the costly evaluation of the constraint Jacobian matrix $$\frac{\partial E}{\partial y}(\cdot)$$

in 652 and therefore avoids the evaluation and storage of higher order derivatives for the nonlinear system dynamics f(•) in 632. In addition, some embodiments are based on the realization that the local QP approximation 720 includes only state and control deviation variables as optimization variables, unlike the exact Jacobian-based QP approximation 640, resulting in a considerable reduction of the computational complexity and the memory requirements for the implementation of the stochastic predictive controller based on the inexact SQP optimization algorithm in FIG. 7B. More specifically, if N denotes the number of intervals in the prediction time horizon, $n_x$ denotes the number of state variables and $n_u$ denotes the number of control input variables, then $y \in \mathbb{R}^{N(n_x+n_u)+n_x}$ and $z \in$ $$R^{(N+1)\frac{n_x(n_x+1)}{2}}.$$

A structure exploiting optimization algorithm asymptotically requires $O(N(n_x+n_x^2+n_u)^2)$ memory and $O(N(n_x+n_x^2+n_u)^3)$ computations to solve the QP approximation 640 in an exact Jacobian-based SQP algorithm. Instead, a structure exploiting optimization algorithm asymptotically requires only $O(N(n_x+n_u)^2)$ memory and $O(N(n_x+n_u)^3)$ computations to solve inexact Jacobian-based local QP approximations 720 to implement the stochastic predictive controller.

Figure 8A:
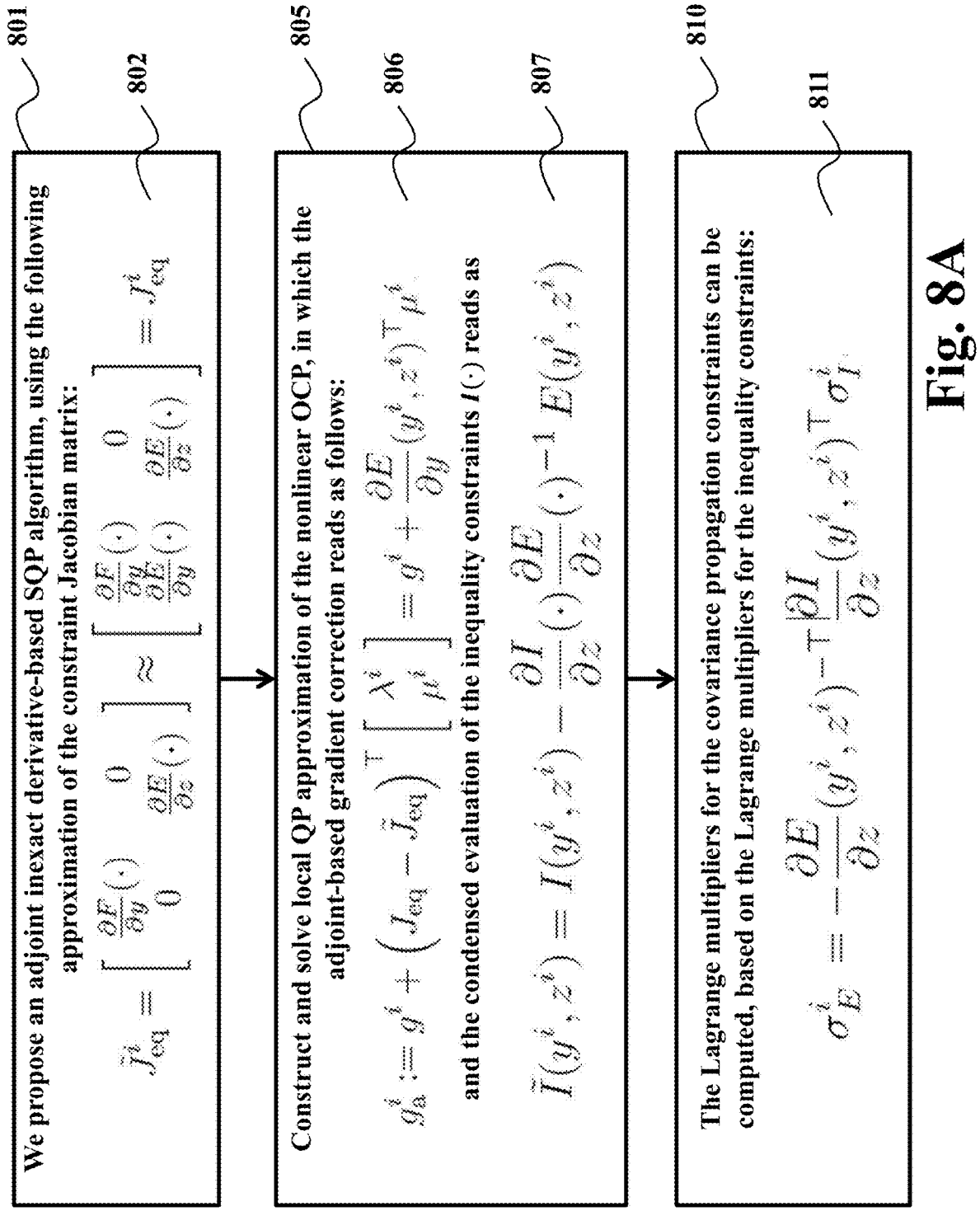
FIG. 8A is a block diagram of a Jacobian matrix approximation and corresponding adjoint-based gradient correction and Lagrange multiplier expansion step for the implementation of an adjoint inexact SQP optimization algorithm.

FIG. 8A shows a block diagram of a particular approximation of the constraint Jacobian matrix 801 that allows the numerical elimination for the trajectory of state covariance matrix variables, resulting in an adjoint-based gradient correction for the local QP approximation of the constrained nonlinear OCP 805 and an expansion step to compute the Lagrange multipliers for the covariance propagation equality constraints 810. More specifically, similar to the inexact SQP optimization algorithm in FIG. 7B, the constraint Jacobian approximation 802 avoids the evaluation of the derivatives in $$\frac{\partial E}{\partial y}(\cdot)$$

in 652:

$$\tilde{J}_{eq}^i = \begin{bmatrix} \frac{\partial E}{\partial y}(\cdot) & 0 \\ 0 & \frac{\partial E}{\partial z}(\cdot) \end{bmatrix} \approx \begin{bmatrix} \frac{\partial E}{\partial y}(\cdot) & 0 \\ \frac{\partial E}{\partial y}(\cdot) & \frac{\partial E}{\partial z}(\cdot) \end{bmatrix} = J_{eq}^i$$

such that the state covariance matrix variables can be eliminated numerically from the local QP approximation at a relatively small computational cost and while preserving the block-structured sparsity of the optimization problem.

Some embodiments of the invention are based on the realization that the gradient vector in the local QP approximation needs to include an adjoint-based gradient correction in order to be able to ensure convergence of the resulting SQP optimization algorithm to a feasible and optimal solution of the constrained NLP 350. This gradient correction depends on the quality of the approximation for the constraint Jacobian matrices of the equality and/or inequality constraints in the local QP approximation of the NLP, i.e., $$g_a^i := g^i + (J_{eq} - \tilde{J}_{eq})^\top \begin{bmatrix} \lambda^i \\ \mu^i \end{bmatrix} = g^i + \frac{\partial E}{\partial y}(y^i, z^i)^\top \mu^i$$

where $g^i$ is the objective gradient vector as in 641 and $g_a^i$ is the corrected gradient vector 806, based on an adjoint derivative evaluation $$\frac{\partial E}{\partial y}(\cdot)^\top \mu^i.$$

Some embodiments of the invention are based on the realization that an adjoint derivative vector evaluation $$\frac{\partial E}{\partial y}(\cdot)^\top \mu^i$$

is considerably cheaper to compute, compared to a complete Jacobian matrix evaluation $$\frac{\partial E}{\partial y}(\cdot),$$

e.g., by using the backward or adjoint mode of algorithmic differentiation (AD).

Based on the constraint Jacobian approximation 802, the state covariance matrix variables can be eliminated numerically using $$\Delta z^i = -\frac{\partial E}{\partial z}(\cdot)^{-1} E(y^i, z^i),$$

resulting in the condensed evaluation of the inequality constraints 807 that read as $$\tilde{I}(y^i, z^i) = I(y^i, z^i) - \frac{\partial I}{\partial z}(\cdot)\frac{\partial E}{\partial z}(\cdot)^{-1} E(y^i, z^i)$$

After solving the resulting local QP approximation, the sequence of state covariance matrix values can be updated as $z^{i+1}=E_z(y^{i+1})$ or using $z^{i+1}=z^i+\Delta z^i$ and $$\Delta z^i = -\frac{\partial E}{\partial z}(\cdot)^{-1} E(y^i, z^i).$$

The Lagrange multiplier values for the covariance propagation constraints $\sigma_E^i$ can be computed, based on the Lagrange multiplier values for the inequality constraints $\sigma_I^i$ from the local QP solution, by using the following expansion step 811

$$\sigma_E^i = -\frac{\partial E}{\partial z}(y^i, z^i)^{-\top}\frac{\partial I}{\partial z}(y^i, z^i)^\top \sigma_I^i$$

which is used for the adjoint-based gradient correction of the local QP subproblem in the next iteration of the inexact SQP optimization algorithm.

Figure 8B:
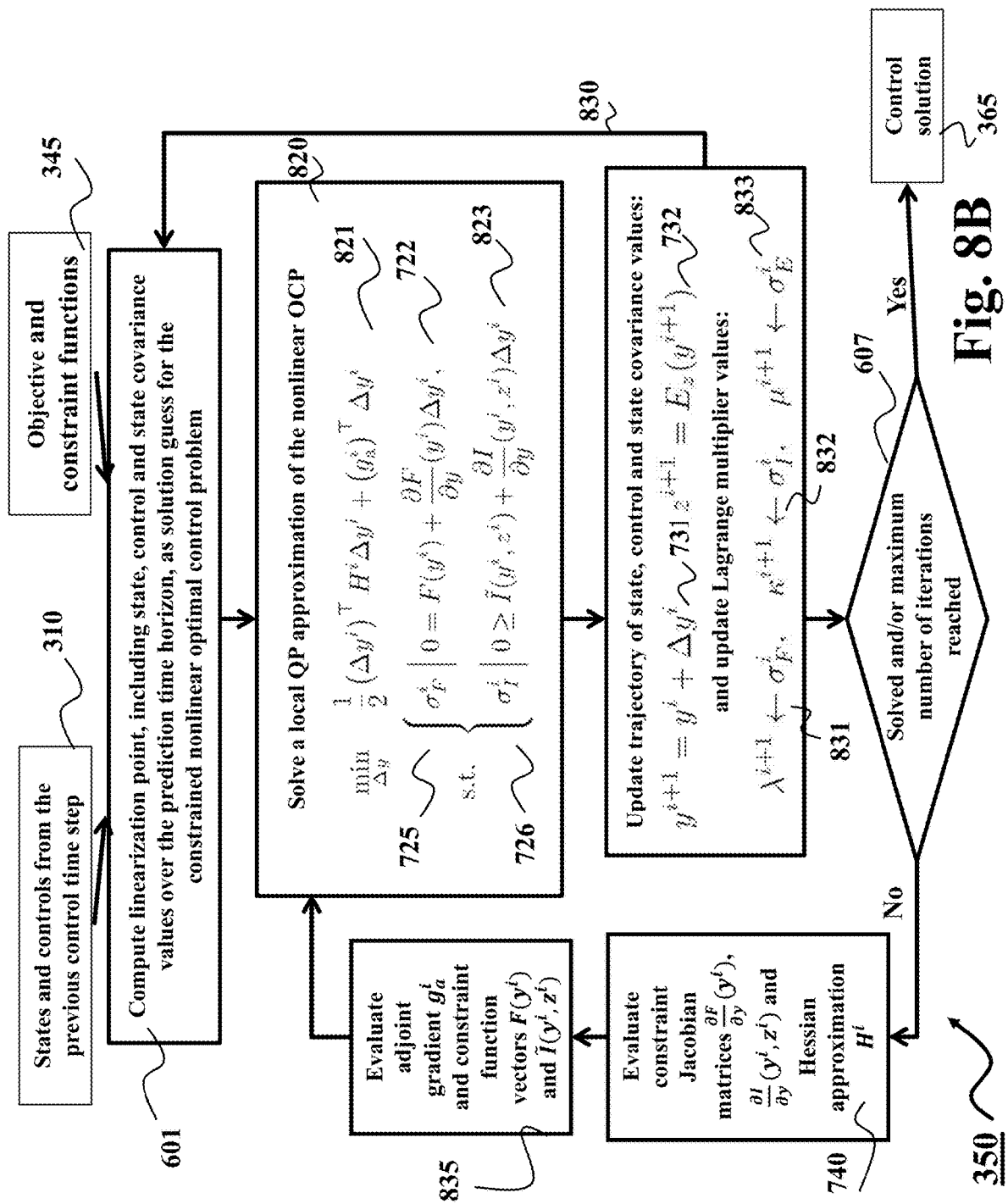
FIG. 8B is a block diagram of an iterative inexact SQP optimization algorithm for the efficient implementation of the stochastic predictive controller based on an adjoint-based gradient correction to improve convergence properties.

FIG. 8B shows a block diagram of an inexact SQP optimization algorithm for the efficient implementation of the stochastic predictive controller, using an adjoint-based gradient correction to improve the convergence properties, according to some embodiments of the invention. The derivative-based iterative optimization procedure avoids the evaluation of the complete constraint Jacobian matrix $$\frac{\partial E}{\partial y}(\cdot)$$

in 652 and instead relies on at most one adjoint derivative evaluation $$\frac{\partial E}{\partial y}(\cdot)^\top \mu^i$$

per SQP iteration. More specifically, some embodiments of the invention solve a local QP approximation of the nonlinear OCP 820 for a given sequence of state and control values $y^i$ and of covariance matrix values $z^i$ as follows $$\min_{\Delta y} \quad \frac{1}{2}(\Delta y^i)^\top H^i \Delta y^i + (g_a^i)^\top \Delta y^i$$

$$\text{s.t.} \begin{cases} \sigma_F^i \mid 0 = F(y^i) + \frac{\partial F}{\partial y}(y^i)\Delta y^i, \\ \sigma_I^i \mid 0 \geq \tilde{I}(y^i, z^i) + \frac{\partial I}{\partial y}(y^i, z^i)\Delta y^i \end{cases}$$

which includes only state and control deviation variables as optimization variables $$\Delta Y = [\Delta x_0^T, \Delta u_0^T, \ldots, \Delta x_{N-1}^T, \Delta u_{N_1}^T, \Delta x_N^T]^T$$

and therefore considerably reduces the computational complexity and memory requirements for an implementation of the adjoint-based inexact SQP optimization algorithm in the stochastic predictive controller.

Unlike the inexact SQP optimization algorithm in FIG. 7B, the adjoint-based inexact QP approximation 820 for the nonlinear OCP in FIG. 8B includes the adjoint-based gradient correction in the linear-quadratic objective function 821 and the condensed evaluation of the inequality constraints 807 in the linearized inequality constraints 823 of the local QP approximation. The optimal Lagrange multiplier values for the equality and inequality constraints are, respectively, denoted as $\sigma_F^i$ 725 and $\sigma_I^i$ 726 for the local QP solution in the $i^{th}$ iteration of the adjoint-based inexact SQP optimization algorithm.

A solution guess for the NLP 601 is used to construct and solve the local QP approximation 820 in order to update the current sequence of state, control and state covariance values over the prediction time horizon 830 as $y^{i+1} = y^i + \Delta y^i$ 731 and $z^{i+1} = E_z(y^{i+1})$ 732, where $\Delta y^i$ denotes the solution of primal optimization variables for the local QP approximation 820 and $z^{i+1} = E_z(y^{i+1})$ denotes the explicit and sequential evaluation of the covariance matrix values over the prediction time horizon 705. The optimization algorithm updates the Lagrange multiplier values for the equality and inequality constraints, respectively, as $\lambda^{i+1} \leftarrow \sigma_F^i$ 831 and $\kappa^{i+1} \leftarrow \sigma_I^i$ 832 using the optimal Lagrange multiplier values from the local QP solution in the $i^{th}$ SQP iteration. In addition, the adjoint-based inexact SQP optimization algorithm computes the Lagrange multiplier values for the covariance propagation equations 833 as $\mu^{i+1} \leftarrow \sigma_E^i$ using $$\sigma_E^i = -\frac{\partial E}{\partial z}(y^i, z^i)^{-\top} \frac{\partial I}{\partial z}(y^i, z^i)^\top \sigma_I^i.$$

Each iteration of the optimization procedure checks whether the solution to the constrained NLP has been found and/or whether a maximum number of iterations has been reached 607. The (approximately) optimal and/or feasible control solution 365 has been found if the termination condition 607 is satisfied, otherwise the procedure needs to evaluate the constraint Jacobian matrices $$\frac{\partial F}{\partial y}(y^i), \frac{\partial I}{\partial y}(y^i, z^i)$$

and Hessian approximation $H^i$ 740 as well as the adjoint-based gradient $g_a^i$ and constraint function vectors $F(y^i)$ and $\tilde{I}(y^i, z^i)$ 835 in order to construct the local QP approximation 820 in the next iteration of the adjoint-based inexact SQP optimization algorithm. The state and control values from the previous control time step 310 can be used to form an initial solution guess and linearization point for the constrained nonlinear optimal control problem 601.

Some embodiments of the invention are based on the realization that the adjoint-based inexact SQP optimization algorithm in FIG. 8B avoids the costly evaluation of the constraint Jacobian matrix $$\frac{\partial E}{\partial y}(\cdot)$$

in 652 but requires at most one adjoint derivative evaluation $$\frac{\partial E}{\partial y}(\cdot)^\top \mu^i$$

per SQP iteration, which is considerably cheaper to compute and store effectively. More specifically, one evaluation of an adjoint derivative $$\frac{\partial E}{\partial y}(\cdot)^\top \mu^i$$

requires only a small multiple of the computations that is needed to perform one evaluation of the discrete-time covariance propagation equations, which can be done efficiently as described in FIG. 7A. In addition, some embodiments of the invention are based on the realization that the adjoint-based gradient correction in local QP approximation 820 results in convergence of the SQP optimization algorithm to a feasible and optimal solution of the constrained NLP 350, unlike the inexact QP approximation 720 that results in a feasible but suboptimal solution of the constrained NLP 350.

As in FIG. 7B, the adjoint-based SQP optimization algorithm of FIG. 8B results in a considerable reduction of the computational complexity and the memory requirements for the implementation of the stochastic predictive controller. More specifically, if N denotes the number of intervals in the prediction time horizon, $n_x$ denotes the number of state variables and $n_u$ denotes the number of control input variables, then $y \in \mathbb{R}^{N(n_x + n_u) + n_x}$ and $$z \in R^{(N+1)\frac{n_x(n_x+1)}{2}}.$$

A structure exploiting optimization algorithm asymptotically requires O(N $(n_x+n_x^2+n_u)^2$) memory and O(N $(n_x+n_x^2+n_u)^3$) computations to solve the QP approximation 640 in an exact Jacobian-based SQP algorithm. Instead, a structure exploiting optimization algorithm asymptotically requires only O(N $(n_x+n_u)^2$) memory and O(N $(n_x+n_u)^3$) computations to solve the adjoint-based inexact Jacobian local QP approximations 820 to implement the stochastic predictive controller.

FIG. 8C shows an algorithmic description of a real-time variant of the adjoint-based inexact SQP optimization algorithm to implement the stochastic nonlinear model predictive controller 840, according to some embodiments of the invention. Based on a solution guess ($y^i$, $z^i$, $\lambda^i$, $\mu^i$, $\kappa^i$) and affine feedback gain matrix K 841, the real-time adjoint-based SQP optimization algorithm 840 computes an updated solution guess ($y^{i+1}$, $z^{i+1}$, $\lambda^{i+1}$, $\mu^{i+1}$, $\kappa^{i+1}$) 856 for the constrained NLP 350. The algorithmic procedure in FIG. 8C describes a real-time optimization algorithm because it performs a limited number of iterations to update the NLP solution guess from one control time step to the next, resulting in fast feedback to the control system 120 under uncertainty 125 while respecting strict timing constraints for the online computations on the embedded microprocessor and allowing the optimization algorithm 840 to converge to a feasible and/or optimal control solution for the constrained NLP in real time. In some embodiments of the invention, only one real-time SQP iteration 840 is performed at each control time step to implement the stochastic predictive controller.

The real-time SQP optimization algorithm 840 consists of a preparation step for the local QP approximation 845, followed by the block-sparse QP solution 850 that allows fast feedback of the control action to the real process 855 and an expansion step for the eliminated primal and dual optimization variables 860. The preparation step evaluates the Jacobian matrices $$\frac{\partial F}{\partial y_k}(y_k^i) \text{ and } \frac{\partial I}{\partial y_k}(y_k^i, z_k^i) \text{ } 846$$

for each interval in the prediction time horizon, i.e., for k=0, . . . , N in the equality and inequality constraints of the local QP approximation 820. Some embodiments of the invention use the forward mode of algorithmic differentiation (AD) to efficiently evaluate these constraint Jacobian matrices 846. In addition, the preparation step evaluates the adjoint-based gradient correction $$g_{a,k}^i = g_k^i + \frac{\partial E}{\partial y_k}(y_k^i, z_k^i)^\top \mu_k^i$$

for k=0, . . . , N in the linear-quadratic objective function 821 using the adjoint mode of AD 847. Finally, the preparation step computes the condensed evaluation of the inequality constraints 823 using the forward (or adjoint) mode of AD 848.

After preparation of the local QP subproblem 845 and after receiving the current state estimate $\hat{x}_t$ 851, the solution step 850 proceeds by solving the block-structured QP in order to obtain $\Delta y^i$, $\sigma_F^i$ and $\sigma_I^i$ 852 and followed by the update of the primal optimization variables $y^{i+1} \leftarrow y^i + \Delta y^i$ as well as the update of the dual optimization variables $\lambda^{i+1} \leftarrow \sigma_F^i$ and $\kappa^{i+1} \leftarrow \sigma_I^i$ 853. Based on the updated trajectory of state and control values, the real-time SNMPC controller provides the control feedback action $u^* = u_0^{i+1} K \hat{x}_t$ to the process 855. Finally, the expansion step includes the computation of the Lagrange multiplier values $\mu^{i+1}$ for the state covariance propagation equations 861, using adjoint AD, and the forward propagation of the updated state covariance matrix values in $z^{i+1}$ 862.

Figure 9A:
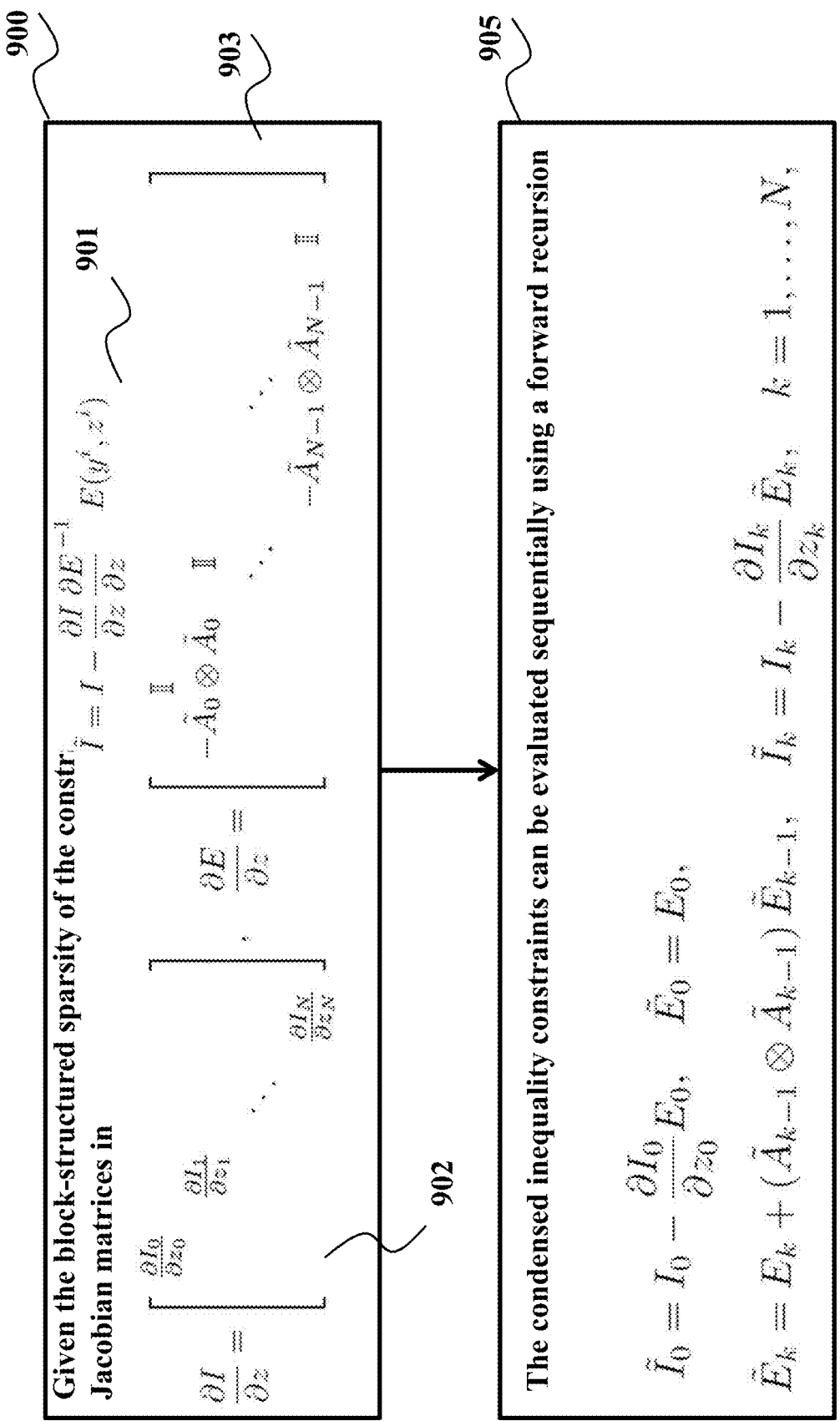
FIG. 9A is a block diagram of the exploitation of the block-structured sparsity of the constraint Jacobian matrices in a forward recursion to compute the condensed inequality constraint values in the adjoint-based SQP optimization algorithm.

FIG. 9A shows a block diagram of the numerical exploitation of the block-structured sparsity of the constraint Jacobian matrices 900

$$\frac{\partial I}{\partial z} = \begin{bmatrix} \frac{\partial I_0}{\partial z_0} & & & \\ & \frac{\partial I_1}{\partial z_1} & & \\ & & \ddots & \\ & & & \frac{\partial I_N}{\partial z_N} \end{bmatrix},$$

$$\frac{\partial E}{\partial z} = \begin{bmatrix} \mathbb{1} & & & \\ -\tilde{A}_0 \otimes \tilde{A}_0 & \mathbb{1} & & \\ & \ddots & \ddots & \\ & & -\tilde{A}_{N-1} \otimes \tilde{A}_{N-1} & \mathbb{1} \end{bmatrix}$$

in order to compute the condensed evaluation of the inequality constraints $$\tilde{I}(\cdot) = I(\cdot)^{-1} - \frac{\partial I}{\partial z}\frac{\partial E^{-1}}{\partial z}E(y^i, z^i) \text{ } 901$$

in the local QP approximation 820 of the adjoint-based inexact SQP optimization algorithm for the SNMPC controller. The block-diagonal sparsity structure of the constraint Jacobian $$\frac{\partial I}{\partial z} \text{ } 902$$

and the block bi-diagonal sparsity structure of the invertible constraint Jacobian $$\frac{\partial E}{\partial z} \text{ } 903$$

can be used directly to compute the condensed evaluation of the inequality constraints 901 based on the following forward recursion formulas 905

$$\tilde{I}_0 = I_0 - \frac{\partial I_0}{\partial z_0}E_0,$$

$$\tilde{E}_0 = E_0,$$

$$\tilde{E}_k = E_k + (\tilde{A}_{k-1} \otimes \tilde{A}_{k-1})\tilde{E}_{k-1},$$

-continued $$\tilde{I}_k = I_k - \frac{\partial I_k}{\partial z_k} \tilde{E}_k,$$

$$k = 1, \ldots, N,$$

using the intermediate values $\tilde{E}=[\tilde{E}_0^T, \tilde{E}_1^T, \ldots, \tilde{E}_N^T]^T$ in order to compute the condensed values $\tilde{I}=[\tilde{I}_0^T, \tilde{I}_1^T, \ldots, \tilde{I}_N^T]^T$ in 823.

FIG. 9B shows a block diagram of the numerical exploitation of the block-structured sparsity of the constraint Jacobian matrices 910

$$\frac{\partial I^T}{\partial z} = \begin{bmatrix} \frac{\partial I_0^T}{\partial z_0} & & & \\ & \frac{\partial I_1^T}{\partial z_1} & & \\ & & \ddots & \\ & & & \frac{\partial I_N^T}{\partial z_N} \end{bmatrix},$$

$$\frac{\partial E^T}{\partial z} = \begin{bmatrix} \mathbb{1} & -\tilde{A}_0^T \otimes \tilde{A}_0^T & & \\ & \mathbb{1} & \ddots & \\ & & \ddots & -\tilde{A}_{N-1}^T \otimes \tilde{A}_{N-1}^T \\ & & & \mathbb{1} \end{bmatrix}$$

in order to compute the Lagrange multiplier values for the state covariance propagation equations $$\sigma_E^i = -\frac{\partial E^{-T}}{\partial z} \frac{\partial I^T}{\partial z} \sigma_I^i \quad 911$$

in the expansion step 861 of the adjoint-based inexact SQP optimization algorithm for the SNMPC controller. The block-diagonal sparsity structure of the constraint Jacobian $$\frac{\partial I^T}{\partial z} \quad 912$$

and the block bi-diagonal sparsity structure of the invertible constraint Jacobian $$\frac{\partial E^T}{\partial z} \quad 913$$

can be used directly to compute the updated values for the Lagrange multipliers based on the following backward recursion formulas 915

$$\tilde{\sigma}_{I_N}^i = \frac{\partial I_N^T}{\partial z_N} \sigma_{I_N}^i,$$

$$\sigma_{E_N}^i = -\tilde{\sigma}_{I_N}^i$$

$$\tilde{\sigma}_{I_k}^i = \frac{\partial I_k^T}{\partial z_k} \sigma_{I_k}^i,$$

$$\sigma_{E_k}^i = -\tilde{\sigma}_{I_k}^i - (\tilde{A}_k \otimes \tilde{A}_k) \tilde{\sigma}_{I_{k+1}}^i,$$

$$k = N-1, \ldots, 0,$$

using the intermediate values $\tilde{\sigma}_I^i = [\tilde{\sigma}_{I_0}^T, \tilde{\sigma}_{I_1}^T, \ldots, \tilde{\sigma}_{I_N}^T]^T$ in order to compute the updated values $\sigma_E^i = [\sigma_{E_0}^T, \sigma_{E_1}^T, \ldots, \sigma_{E_N}^T]^T$ in 861.

Figure 10A:
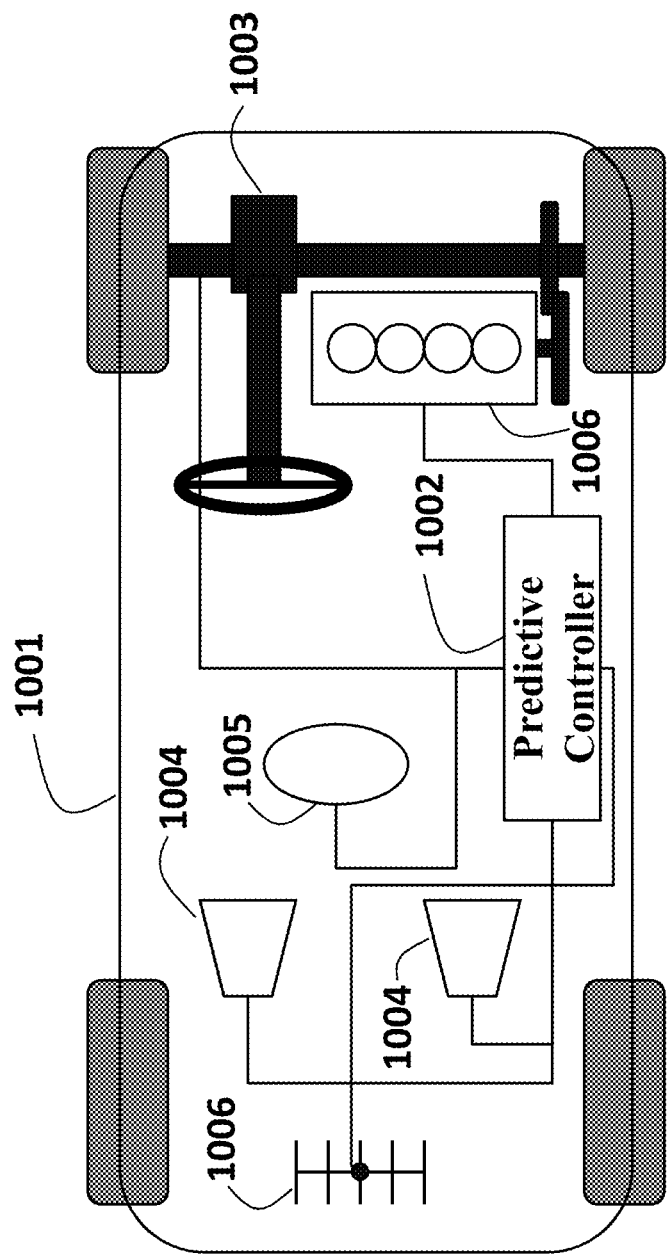
FIG. 10A is a schematic of a vehicle including a controller employing principles of some embodiments.

FIG. 10A shows a schematic of a vehicle 1001 including a stochastic predictive controller 1002 employing principles of some embodiments. As used herein, the vehicle 1001 can be any type of wheeled vehicle, such as a passenger car, bus, or rover. Also, the vehicle 1001 can be an autonomous or semi-autonomous vehicle. For example, some embodiments control the motion of the vehicle 1001. Examples of the motion include lateral motion of the vehicle controlled by a steering system 1003 of the vehicle 1001. In one embodiment, the steering system 1003 is controlled by the controller 1002. Additionally or alternatively, the steering system 1003 can be controlled by a driver of the vehicle 1001.

The vehicle can also include an engine 1006, which can be controlled by the controller 1002 or by other components of the vehicle 1001. The vehicle can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors provide information to the controller 1002. The vehicle can be equipped with a transceiver 1006 enabling communication capabilities of the controller 1002 through wired or wireless communication channels.

Figure 10B:
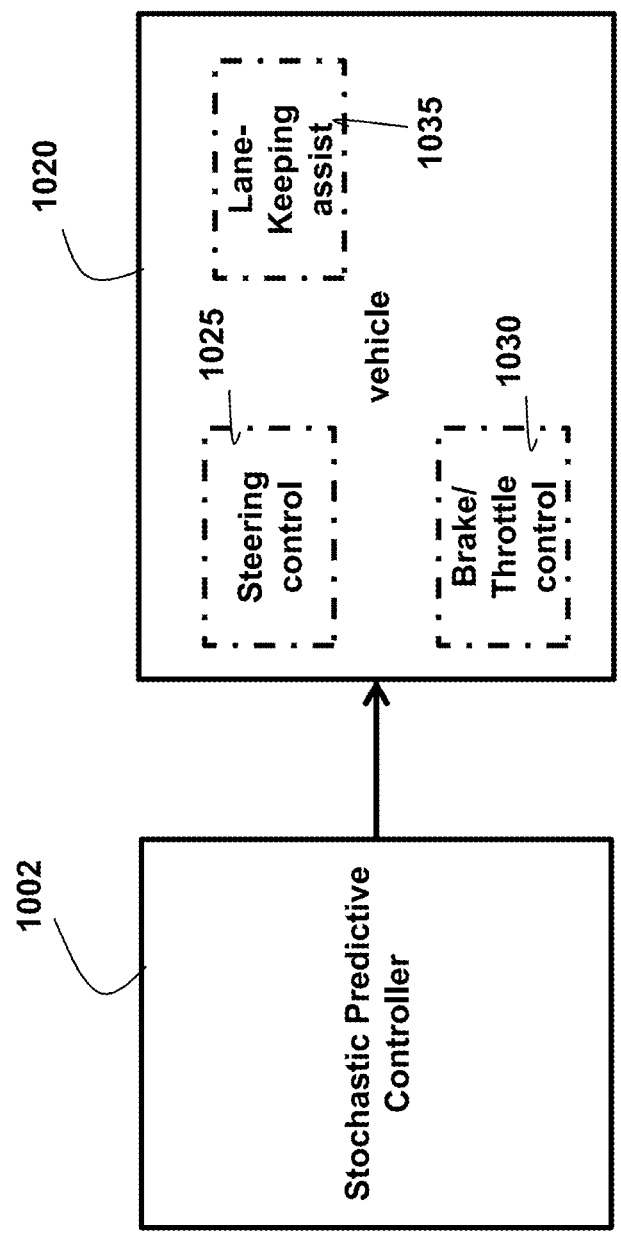
FIG. 10B is a schematic of interaction between the controller employing principles of some embodiments and controllers of the vehicle 1001 according to some embodiments.

FIG. 10B shows a schematic of interaction between the stochastic predictive controller 1002 and the controllers 1020 of the vehicle 1001 according to some embodiments. For example, in some embodiments, the controllers 1020 of the vehicle 1001 are steering 1025 and brake/throttle controllers 1030 that control rotation and acceleration of the vehicle 1020. In such a case, the stochastic predictive controller 1002 outputs control inputs to the controllers 1025 and 1030 to control the state of the vehicle. The controllers 1020 can also include high-level controllers, e.g., a lane-keeping assist controller 1035 that further process the control inputs of the stochastic predictive controller 1002. In both cases, the controllers 1020 maps use the outputs of the stochastic predictive controller 1002 to control at least one actuator of the vehicle, such as the steering wheel and/or the brakes of the vehicle, in order to control the motion of the vehicle.

Figure 10C:
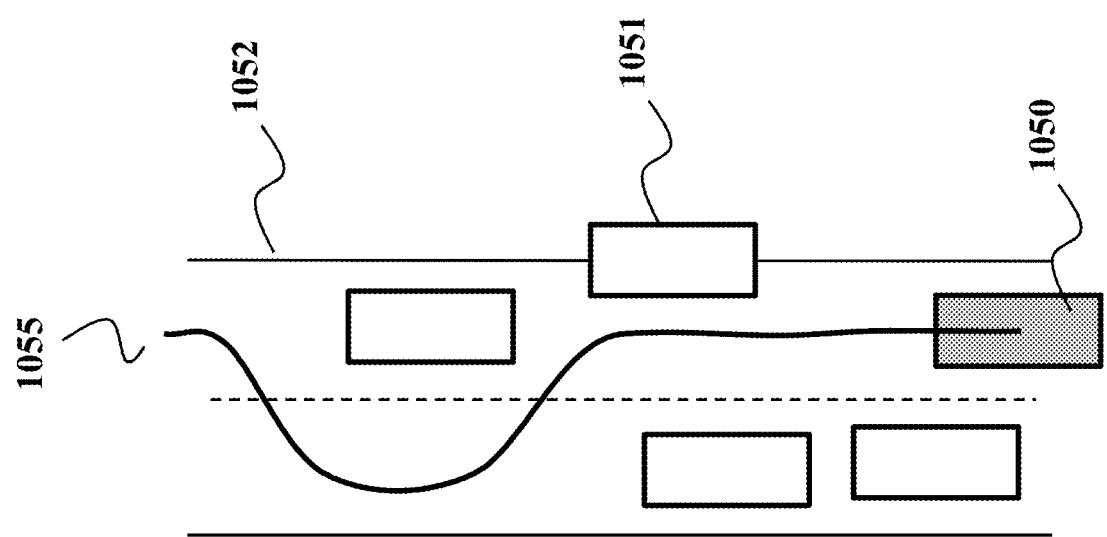
FIGS. 10C and 10D are schematics of a motion planning and/or predictive control method for a controlled vehicle employing principles of some embodiments.
Figure 10D:
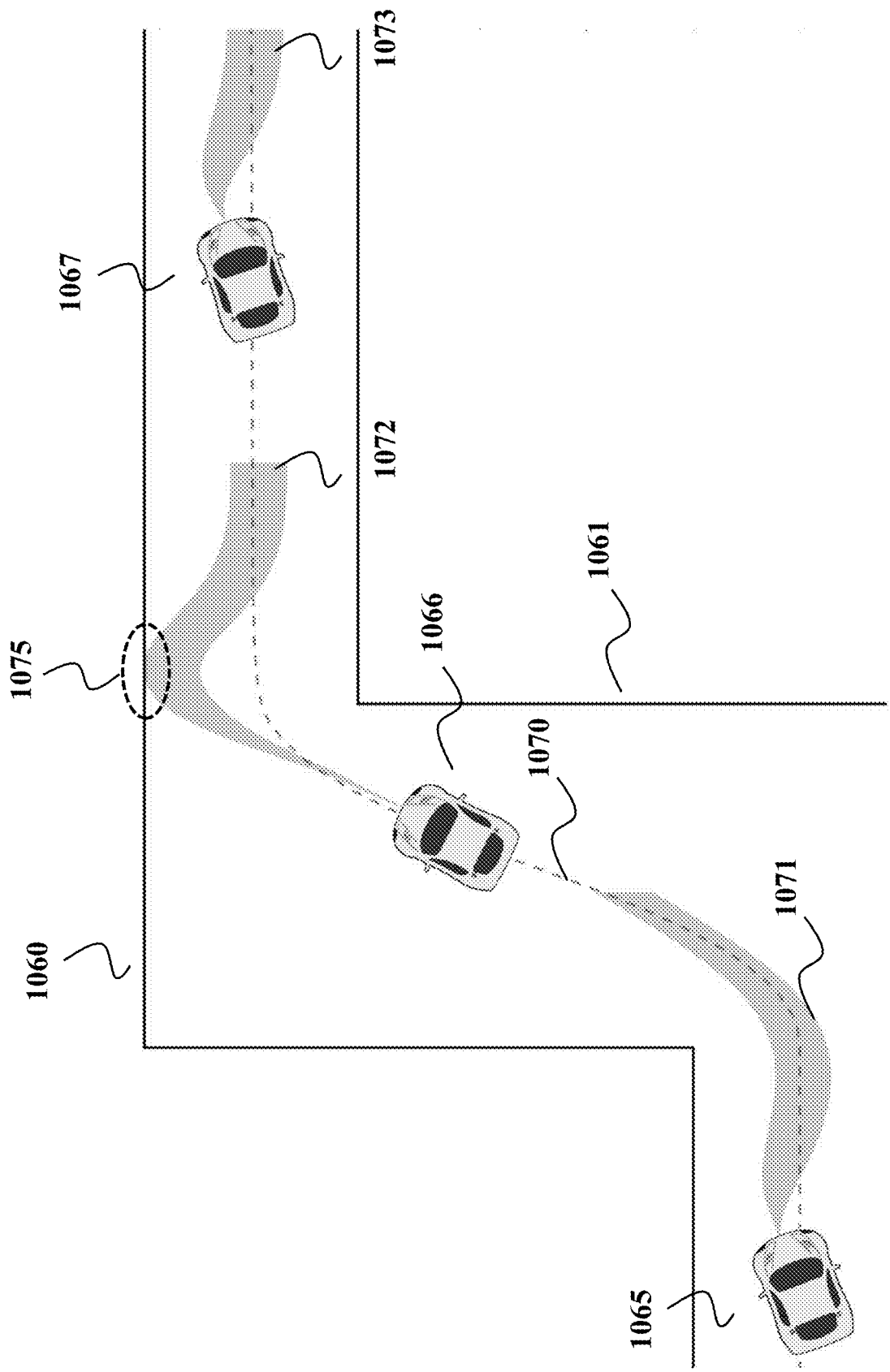

FIG. 10C shows a schematic of an autonomous or semi-autonomous controlled vehicle 1050 for which a dynamically feasible, and often optimal trajectory 1055 can be computed by using embodiments of this invention. The generated trajectory aims to keep the vehicle within particular road bounds 1052, and aims to avoid other uncontrolled vehicles, i.e., obstacles 1051 for the controlled vehicle 1050. In some embodiments, each of the obstacles 1051 can be represented by one or multiple inequality constraints in a time or space formulation of the constrained optimal control problem. For example, based on embodiments configured to implement a stochastic model predictive controller, the autonomous or semi-autonomous controlled vehicle 1050 can make decisions in real time such as, e.g., pass another vehicle on the left or on the right side or instead to stay behind another vehicle within the current lane of the road 1052. Embodiments of the invention are based on an SNMPC controller that directly takes into account the uncertainty about the current state and the predicted state of the vehicle 1050, the uncertainty about the parameters in the vehicle model as well as the uncertainty about the current and predicted state of the environment, e.g., including the obstacles 1051 that are within a certain distance from the position of the autonomous or semi-autonomous controlled vehicle 1050. FIG. 10D shows a schematic of a vehicle 1065 that is controlled by an SNMPC controller that aims to track a dynamically feasible and optimal trajectory 1070 of a sharp lane change maneuver within the upper 1060 and lower 1061 road bounds by using embodiments of this invention. FIG. 10D shows the vehicle position 1065, including the propagation of uncertainty for the predicted state trajectories by the SNMPC controller 1071, at a first time point, the vehicle position 1066 and corresponding propagation of predicted state uncertainty 1072 at a second time point, and the vehicle position 1067 and corresponding propagation of predicted state uncertainty 1073 at a third time point. The use of the stochastic predictive controller with probabilistic chance constraints, according to some embodiments of the invention, allows the probability of the controlled vehicle to violate the road bound constraints 1060 and/or 1061 to be below a certain probability threshold value. More specifically, FIG. 10D shows that the stochastic tube of predicted state trajectories 1072 at the second time point reaches 1075 the upper road bound constraint 1060, illustrating the behavior of the stochastic predictive controller that aims to satisfy both deterministic constraints and probabilistic chance constraints for the controlled system under uncertainty.

Examples of the uncertainty for the system and its environment can include any parameters related to the friction behavior between the tires of the vehicle and the road surface, e.g., the parameters in a Pacejka tire-force model that can be learned or estimated either offline and/or online while controlling the vehicle. The estimated parameter values as well as the estimated uncertainty can be defined as time-varying and uncertain disturbance variables in the direct optimal control problem formulation of the stochastic nonlinear model predictive controller, according to embodiments of the invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A predictive controller for controlling a system under uncertainty subject to constraints on state and control variables of the system, comprising: at least one processor; and memory having instructions stored thereon that, when executed by the at least one processor, cause the predictive controller to:

solve, at each control step of the predictive controller, an inequality constrained nonlinear dynamic optimization problem including probabilistic chance constraints representing the uncertainty to produce a control command, wherein the predictive controller solves the dynamic optimization problem based on a two-level optimization using an inexact sequential convex programming (SCP) that alternates propagation of covariance matrices of predicted state variables in the probabilistic chance constraints within the entire prediction horizon for fixed values of the state and control variables with optimization of the state and control variables within the entire prediction horizon for fixed values of the covariance matrices, wherein the system is a vehicle, and wherein the state of the vehicle includes one or a combination of a position, an orientation, a velocity, an angular velocity, a slip ratio, and a slip angle of the vehicle, wherein the control command includes one or a combination of acceleration, brake torques, a steering angle, and steering rate values, and wherein the uncertainty of the control command includes time-varying disturbances including one or combination of uncertainty in mass value, inertia values, or both in a model of the vehicle, uncertainty in a steering model of the vehicle, uncertainty in one or multiple parameter values indicative of friction between tires of the vehicle and a road surface; and control an operation of the system using the control command.

2. The predictive controller of claim 1, wherein the constraints on state and control variables of the system include inequality constraints, and wherein the probabilistic chance constraints are based on a tightening of one or multiple inequality constraints with a term that depends on a back-off coefficient value, a constraint Jacobian matrix and a covariance matrix for the predicted state variables at each time step within the prediction horizon, to reduce the probability of violating each of the corresponding inequality constraints below a probability threshold value.

3. The predictive controller of claim 1, wherein the propagation of the covariance matrices for each time step within the prediction horizon is performed by evaluating nonlinear covariance propagation equations with respect to current values of the state and control variables optimized for the prediction horizon.

4. The predictive controller of claim 3, wherein the nonlinear covariance propagation equations are linearization-based discrete-time Lyapunov equations that preserve positive definiteness of the covariance matrices at each control time step using Jacobian matrices precomputed with respect to the current values of the state and control variables optimized for the prediction horizon.

5. The predictive controller of claim 3, wherein the propagation of the covariance matrices for each time step within the prediction horizon is performed for a pre-stabilized system of nonlinear system dynamics based on future feedback control actions in a forward propagation of uncertainty for the predicted state variables within the prediction horizon.

6. The predictive controller of claim 5, wherein the pre-stabilized system of nonlinear system dynamics uses a time-invariant or a time-varying sequence of affine feedback gains.

7. The predictive controller of claim 5, wherein the inequality constrained nonlinear dynamic optimization problem includes one or multiple probabilistic chance constraints for one or multiple inequality constraints of feedback control actions within the prediction horizon.

8. The predictive controller of claim 1, wherein the optimization of the state and control variables within the prediction horizon for the fixed values of the covariance matrices is performed using an inexact sequential quadratic programming (SQP) with fixed values of the covariance matrices at each quadratic programming (QP) subproblem preserving a block-structured sparsity without computing derivatives of covariance propagation equations with respect to the state and control variables and without computing derivatives of probabilistic chance inequality constraints with respect to covariance matrix variables.

9. The predictive controller of claim 8, wherein the optimization of the state and control variables within the prediction horizon for the fixed values of the covariance matrices is performed with adjoint gradient computations such that a solution of the block-structured QP subproblem includes an adjoint-based gradient evaluation in the linear-quadratic objective function, in which the additional adjoint-based gradient is evaluated using Lagrange multiplier values for the covariance propagation equations and the gradient represents an effect of the covariance equations on optimality for the state and control variables.

10. The predictive controller of claim 9, in which the Lagrange multiplier values for the covariance propagation equations are updated after each solution of the QP subproblem in the inexact SQP optimization algorithm using an expansion step based on Lagrange multiplier values for the inequality constraints.

11. The predictive controller of claim 1, wherein the optimization of the state and control variables numerically eliminates state variables at each time step in the prediction horizon in a condensing routine as a function of initial values of the state variables and the control variables at all previous time steps in the prediction horizon, such that after each solution of the condensed QP subproblem, the values for the state variables are updated by simulating the linearized system dynamics starting from the initial state values using the updated control values at each time step in the prediction horizon.

12. The predictive controller of claim 1, wherein the predictive controller uses only one or a predetermined number of iterations for the two-level optimization algorithm to solve the inequality constrained nonlinear dynamic optimization problem at each control step starting from an optimal or suboptimal sequence of state and control values and covariance matrix values over the prediction horizon at the previous control step.

13. The predictive controller of claim 12, wherein the two-level optimization is based on an inexact SQP optimization method that solves only one or a predetermined number of block-structured QP subproblems at each control step to update an optimal or suboptimal sequence of state and control values and covariance matrix values over the prediction horizon.

14. A predictive control method for controlling a system under uncertainty subject to constraints on state and control variables of the system, wherein the method uses a processor coupled with stored instructions implementing the method, wherein the instructions, when executed by the processor carry out steps of the method, comprising:
    solving, at each control step of the predictive control method, an inequality constrained nonlinear dynamic optimization problem including probabilistic chance constraints representing the uncertainty to produce a control command, wherein the predictive controller solves the dynamic optimization problem based on a two-level optimization using an inexact sequential convex programming (SCP) that alternates propagation of covariance matrices of predicted state variables in the probabilistic chance constraints within the entire prediction horizon for fixed values of the state and control variables with optimization of the state and control variables within the entire prediction horizon for fixed values of the covariance matrices, wherein the system is a vehicle, and wherein the state of the vehicle includes one or a combination of a position, an orientation, a velocity, an angular velocity, a slip ratio, and a slip angle of the vehicle, wherein the control command includes one or a combination of acceleration, brake torques, a steering angle, and steering rate values, and wherein the uncertainty of the control command includes time-varying disturbances including one or combination of uncertainty in mass value, inertia values, or both in a model of the vehicle, uncertainty in a steering model of the vehicle, uncertainty in one or multiple parameter values indicative of friction between tires of the vehicle and a road surface; and
    controlling an operation of the system using the control command.

15. The predictive control method of claim 14, wherein the constraints on state and control variables of the system include inequality constraints, and wherein the probabilistic chance constraints are based on a tightening of one or multiple inequality constraints with a term that depends on a back-off coefficient value, a constraint Jacobian matrix and a covariance matrix for the predicted state variables at each time step within the prediction horizon, to reduce the probability of violating each of the corresponding inequality constraints below a probability threshold value.

16. The predictive control method of claim 14, wherein the propagation of the covariance matrices for each time step within the prediction horizon is performed by evaluating nonlinear covariance propagation equations with respect to current values of the state and control variables optimized for the prediction horizon.

17. A non-transitory computer-readable storage medium embodied thereon a program executable by a processor for performing a predictive control method for controlling a system under uncertainty subject to constraints on state and control variables of the system, the method comprising:
    solving, at each control step of the predictive control method, an inequality constrained nonlinear dynamic optimization problem including probabilistic chance constraints representing the uncertainty to produce a control command, wherein the predictive controller solves the dynamic optimization problem based on a two-level optimization using an inexact sequential convex programming (SCP) that alternates propagation of covariance matrices of predicted state variables in the probabilistic chance constraints within the entire prediction horizon for fixed values of the state and control variables with optimization of the state and control variables within the entire prediction horizon for fixed values of the covariance matrices, wherein the system is a vehicle, and wherein the state of the vehicle includes one or a combination of a position, an orientation, a velocity, an angular velocity, a slip ratio, and a slip angle of the vehicle, wherein the control command includes one or a combination of acceleration, brake torques, a steering angle, and steering rate values, and wherein the uncertainty of the control command includes time-varying disturbances including one or combination of uncertainty in mass value, inertia values, or both in a model of the vehicle, uncertainty in a steering model of the vehicle, uncertainty in one or multiple parameter values indicative of friction between tires of the vehicle and a road surface; and
controlling an operation of the system using the control command.

* * * * *